(12) United States Patent
Hayes et al.

(10) Patent No.: US 11,724,896 B2
(45) Date of Patent: *Aug. 15, 2023

(54) HIGH-SPEED MULTI-PURPOSE MIX LOAD ROBOTIC END-OF-ARM TOOLING AND METHOD OF USING SAME

(71) Applicant: Robogistics LLC, Port Arthur, TX (US)

(72) Inventors: David Hayes, Silsbee, TX (US); Tony Hannon, Mauriceville, TX (US); James C. Caraway, Lumberton, TX (US); Salahuddin Wyatt-Khan, Cincinatti, OH (US)

(73) Assignee: Robogistics LLC, Port Arthur, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/862,670

(22) Filed: Jul. 12, 2022

(65) Prior Publication Data

US 2022/0348424 A1 Nov. 3, 2022

Related U.S. Application Data

(63) Continuation of application No. 16/945,373, filed on Jul. 31, 2020, now Pat. No. 11,414,279.

(60) Provisional application No. 62/882,304, filed on Aug. 2, 2019.

(51) Int. Cl.
*B65G 59/04* (2006.01)
*B65G 47/91* (2006.01)

(52) U.S. Cl.
CPC ............. *B65G 59/04* (2013.01); *B65G 47/91* (2013.01); *B65G 2201/0267* (2013.01)

(58) Field of Classification Search
CPC .................. B65G 59/04; B65G 47/91; B65G 2201/0267; B65G 57/06; B65G 57/24; B65G 57/04; B65G 47/90
USPC .......................................................... 414/799
See application file for complete search history.

(56) References Cited

U.S. PATENT DOCUMENTS

| 4,354,786 | A |   | 10/1982 | Spitler |             |
|-----------|---|---|---------|---------|-------------|
| 4,870,592 | A | * | 9/1989  | Lampi   | G05B 19/4189 |
|           |   |   |         |         | 29/563      |
| 5,088,783 | A | * | 2/1992  | Squires | B66C 1/447  |
|           |   |   |         |         | 414/626     |

(Continued)

OTHER PUBLICATIONS

USPTO Non-Final Office Action for U.S. Appl. No. 16/945,373 dated Mar. 30, 2021.

(Continued)

*Primary Examiner* — Lynn E Schwenning
(74) *Attorney, Agent, or Firm* — Tumey L.L.P.; Eric M. Adams; Tod T. Tumey

(57) ABSTRACT

One or more specific embodiments disclosed herein may include a method of moving materials using an end-of-arm tool comprising aligning the end-of-arm tool over a payload, wherein the end-of-arm tool comprises an undercarriage in a retracted position, a plurality of clamp plates in an extended position, and one or more vacuum cups; lowering the end-of-arm tool towards the payload; engaging the payload with the one or more vacuum cups; engaging the payload with the plurality of clamp plates; and raising the payload into the interior of the end-of-arm tool.

9 Claims, 19 Drawing Sheets

(56) References Cited

U.S. PATENT DOCUMENTS

| | | | | |
|---|---|---|---|---|
| 6,273,670 B1 * | 8/2001 | Henson | | B65G 59/063 |
| | | | | 209/583 |
| 6,658,816 B1 * | 12/2003 | Parker | | B65G 57/005 |
| | | | | 414/788.1 |
| 6,802,688 B1 | 10/2004 | Andersen et al. | | |
| 7,481,472 B2 | 1/2009 | Cawley et al. | | |
| 7,547,052 B2 * | 6/2009 | Yohe | | B65G 47/90 |
| | | | | 294/197 |
| 8,554,371 B2 * | 10/2013 | Parker | | B25J 9/1669 |
| | | | | 700/254 |
| 8,915,696 B2 | 12/2014 | Baumann et al. | | |
| 9,260,256 B2 | 2/2016 | Christensen et al. | | |
| 9,272,421 B2 * | 3/2016 | Subotincic | | B25J 15/0616 |
| 9,592,970 B2 * | 3/2017 | Henderson | | B65G 57/24 |
| 10,138,079 B2 * | 11/2018 | Murarotto | | B66C 1/0218 |
| 10,457,502 B2 | 10/2019 | Morency et al. | | |
| 10,858,204 B2 | 12/2020 | Tommesani | | |
| 11,414,279 B2 * | 8/2022 | Hayes | | B65G 47/91 |
| 2005/0265817 A1 * | 12/2005 | Blanc | | B65G 57/24 |
| | | | | 414/799 |
| 2009/0013860 A1 * | 1/2009 | Givens | | B25J 9/1065 |
| | | | | 901/30 |
| 2011/0186556 A1 * | 8/2011 | Heinrich | | B23K 9/0282 |
| | | | | 219/136 |
| 2011/0293397 A1 | 12/2011 | Lomerson, Jr. | | |
| 2013/0015675 A1 | 1/2013 | Pickard et al. | | |

OTHER PUBLICATIONS

USPTO Final Office Action for U.S. Appl. No. 16/945,373 dated Dec. 30, 2021.

USPTO Notice of Allowance for U.S. Appl. No. 16/945,373 dated Apr. 7, 2022.

* cited by examiner

HIGH-SPEED MULTI-PURPOSE MIX LOAD ROBOTIC END-OF-ARM TOOLING AND METHOD OF USING SAME

CROSS-REFERENCE TO RELATED APPLICATIONS

This application claims priority to U.S. Provisional Patent Application No. 62/882,304 filed Aug. 2, 2019, as well as U.S. application Ser. No. 16/945,373 filed Jul. 31, 2020, the entire disclosures of which are incorporated herein by reference.

BACKGROUND

1. Field of Inventions

The field of this application and any resulting patent is a multi-purpose, end-of-arm tool and method of using same.

2. Description of Related Art

Various devices and tools have been proposed and utilized for moving payloads from one location to another, including some of the devices and tools in the references appearing on the face of this patent. However, those devices and tools lack all the steps or features of the devices and tools covered by any patent claims below. As will be apparent to a person of ordinary skill in the art, any devices and tools covered by claims of the issued patent solve many of the problems that prior art devices and tools have failed to solve. Also, the devices and tools covered by at least some of the claims of this patent have benefits that could be surprising and unexpected to a person of ordinary skill in the art based on the prior art existing at the time of invention.

SUMMARY

One or more specific embodiments disclosed herein may include an end-of-arm tool for moving payloads from one location to another, comprising a mast system comprising a mast, a plurality of mast gussets, and a mast plate; a frame; a clamp system comprising a plurality of clamp plates and a plurality of ball screws; and a vacuum system comprising a vacuum plate and one or more vacuum cups.

One or more specific embodiments disclosed herein may include a method of moving materials using an end-of-arm tool comprising aligning the end-of-arm tool over a payload, wherein the end-of-arm tool comprises an undercarriage in a retracted position, a plurality of clamp plates in an extended position, and one or more vacuum cups; lowering the end-of-arm tool towards the payload; engaging the payload with the one or more vacuum cups; engaging the payload with the plurality of clamp plates; and raising the payload into the interior of the end-of-arm tool.

One or more specific embodiments disclosed herein may include a method of moving materials using a pallet-carry end-of-arm tool comprising positioning a pallet stack over a lift table on a conveyor; aligning the end-of-arm tool over the pallet stack, wherein the end-of-arm tool comprises a plurality of claim plates in an extended position; lowering the end-of-arm tool towards the pallet stack; activating the lift table, wherein the lift table raises the pallet stack, and further wherein the lifting table provides an overhang below the pallet stack; lowering the end-of-arm tool around the pallet stack, wherein the plurality of clamp plates is positioned underneath the pallet stack; moving the plurality of clamp plates into a retracted position; and raising the pallet stack from the conveyor.

DETAILED DESCRIPTION

1. Introduction

Figure 1:
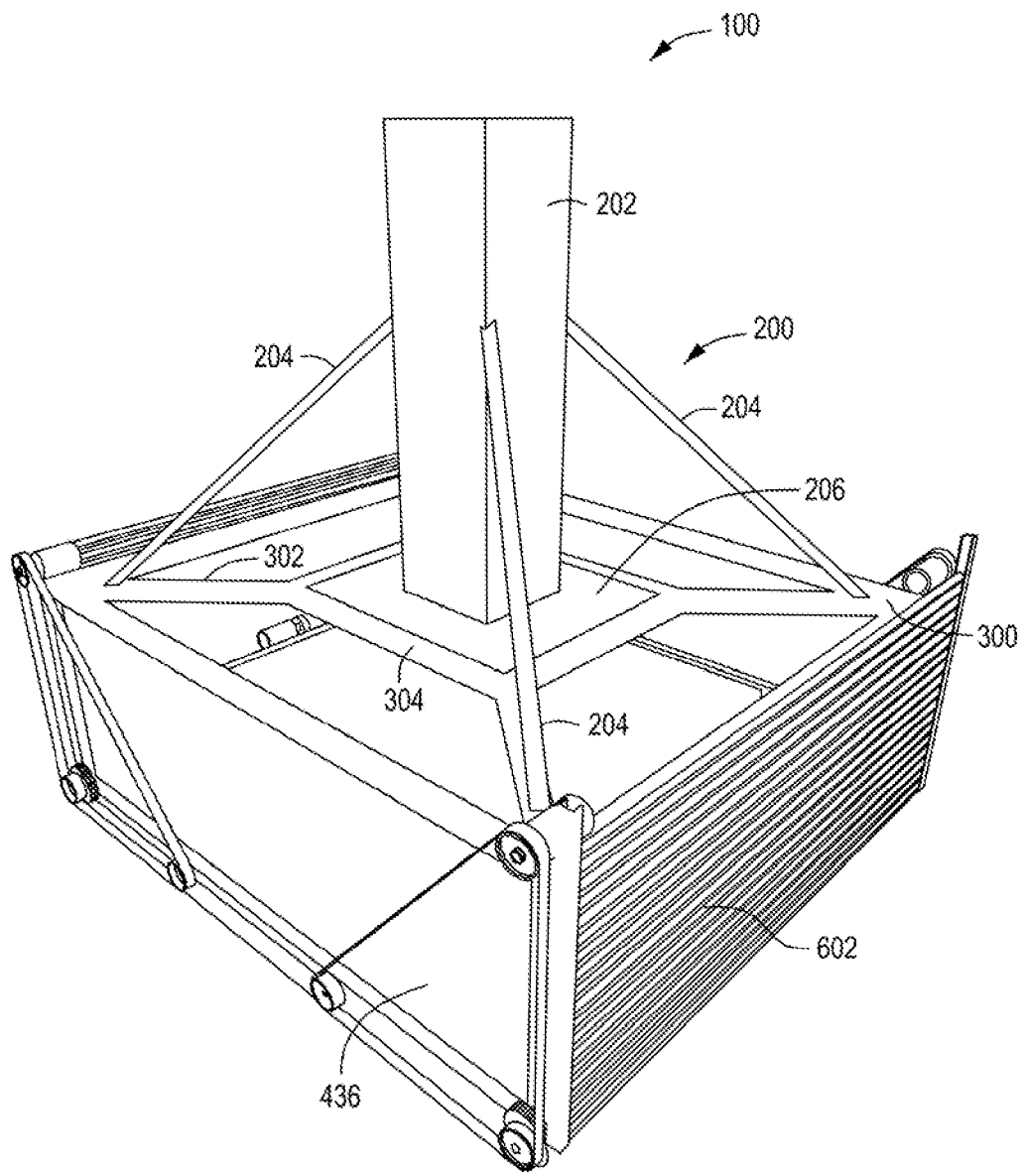
FIG. 1 is a perspective view of an embodiment of a multi-purpose end-of-arm tool looking down.

A detailed description will now be provided. The purpose of this detailed description, which includes the drawings, is to satisfy the statutory requirements of 35 U.S.C. § 112. For example, the detailed description includes a description of the inventions defined by the claims and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are not all necessarily drawn to scale, nor do they show all the structural details of the systems, nor do they limit the scope of the claims.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology.

2. Certain Specific Embodiments

Now, certain specific embodiments are described, which are by no means an exclusive description of the inventions. Other specific embodiments, including those referenced in the drawings, are encompassed by this application and any patent that issues therefrom.

One or more specific embodiments disclosed herein may include an end-of-arm tool for moving payloads from one location to another, comprising a mast system comprising a mast, a plurality of mast gussets, and a mast plate; a frame; a clamp system comprising a plurality of clamp plates and a plurality of ball screws; and a vacuum system comprising a vacuum plate and one or more vacuum cups.

One or more specific embodiments disclosed herein may include a method of moving materials using an end-of-arm tool comprising aligning the end-of-arm tool over a payload, wherein the end-of-arm tool comprises an undercarriage in a retracted position, a plurality of clamp plates in an extended position, and one or more vacuum cups; lowering the end-of-arm tool towards the payload; engaging the payload with the one or more vacuum cups; engaging the payload with the plurality of clamp plates; and raising the payload into the interior of the end-of-arm tool.

One or more specific embodiments disclosed herein may include a method of moving materials using a pallet-carry end-of-arm tool comprising positioning a pallet stack over a lift table on a conveyor; aligning the end-of-arm tool over the pallet stack, wherein the end-of-arm tool comprises a plurality of claim plates in an extended position; lowering the end-of-arm tool towards the pallet stack; activating the lift table, wherein the lift table raises the pallet stack, and further wherein the lifting table provides an overhang below the pallet stack; lowering the end-of-arm tool around the pallet stack, wherein the plurality of clamp plates is positioned underneath the pallet stack; moving the plurality of clamp plates into a retracted position; and raising the pallet stack from the conveyor.

In any one of the tools or methods disclosed herein, the plurality of claim plates may comprise at least one accepting plate and at least one insertion plate.

In any one of the tools or methods disclosed herein, the at least one accepting plate and the at least one insertion plate may be positioned perpendicularly to each other.

In any one of the tools or methods disclosed herein, the end-of-arm tool may further comprise an undercarriage system.

In any one of the tools or methods disclosed herein, the undercarriage system may comprise a pulley system.

In any one of the tools or methods disclosed herein, the method may further comprise preprogramming the end-of-arm tool prior to the aligning step.

In any one of the tools or methods disclosed herein, the method may further comprise lowering the end-of-arm tool to a preprogrammed, predetermined height over the payload or pallet stack.

In any one of the tools or methods disclosed herein, the method may further comprise deploying the undercarriage.

In any one of the tools or methods disclosed herein, the end-of-arm tool may be attached to a gantry.

In any one of the tools or methods disclosed herein, the end-of-arm tool may further comprise a vacuum plate.

In any one of the tools or methods disclosed herein, the method may further comprise lowering the vacuum plate to engage the pallet stack.

In any one of the tools or methods disclosed herein, the plurality of clamp plates may further comprise actuating the plurality of clamp plates inward, wherein the plurality of clamp plates may be positioned under the pallet stack.

In any one of the tools or methods disclosed herein, the plurality of clamp plates may support the pallet stack.

In any one of the tools or methods disclosed herein, the method may further comprise lowering the lift table to the original position of the lift table.

3. Specific Embodiments in the Figures

The drawings presented herein are for illustrative purposes only and are not intended to limit the scope of the claims. Rather, the drawings are intended to help enable one having ordinary skill in the art to make and use the claimed inventions.

Referring to FIGS. 1-9, a specific embodiment, e.g., version or example, of a multi-purpose end-of-arm tool is illustrated. These figures may show features which may be found in various specific embodiments, including the embodiments shown in this specification and those not shown.

Figure 7:
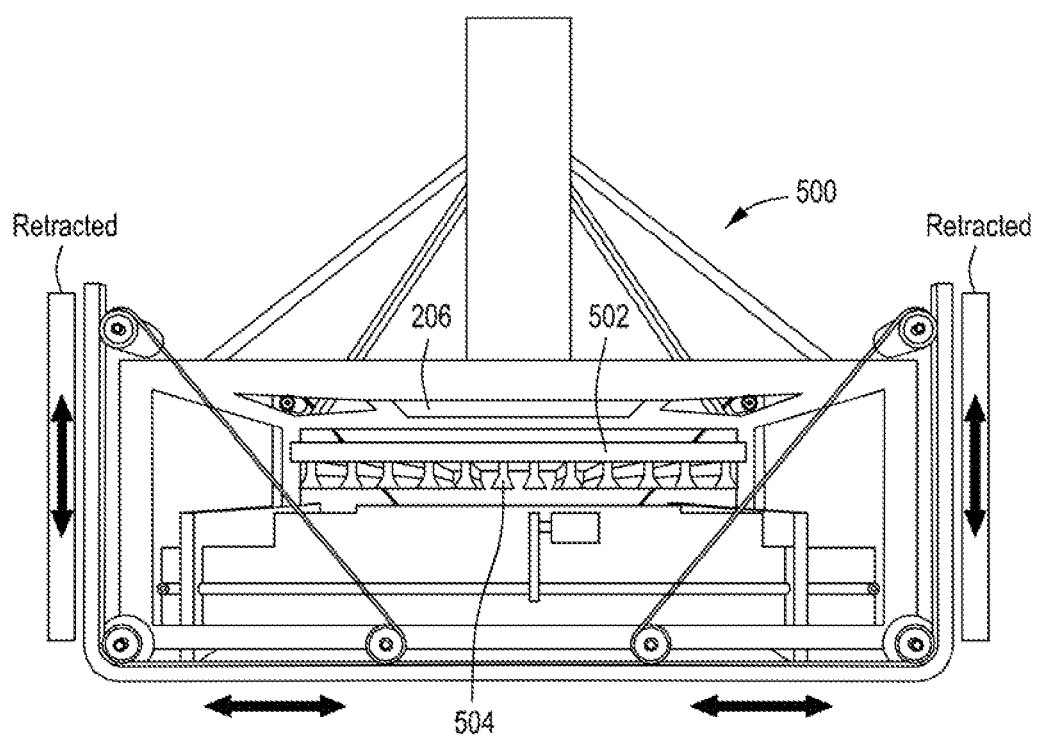
FIG. 7 is a side view of an embodiment of a multi-purpose end-of-arm tool.
Figure 8:
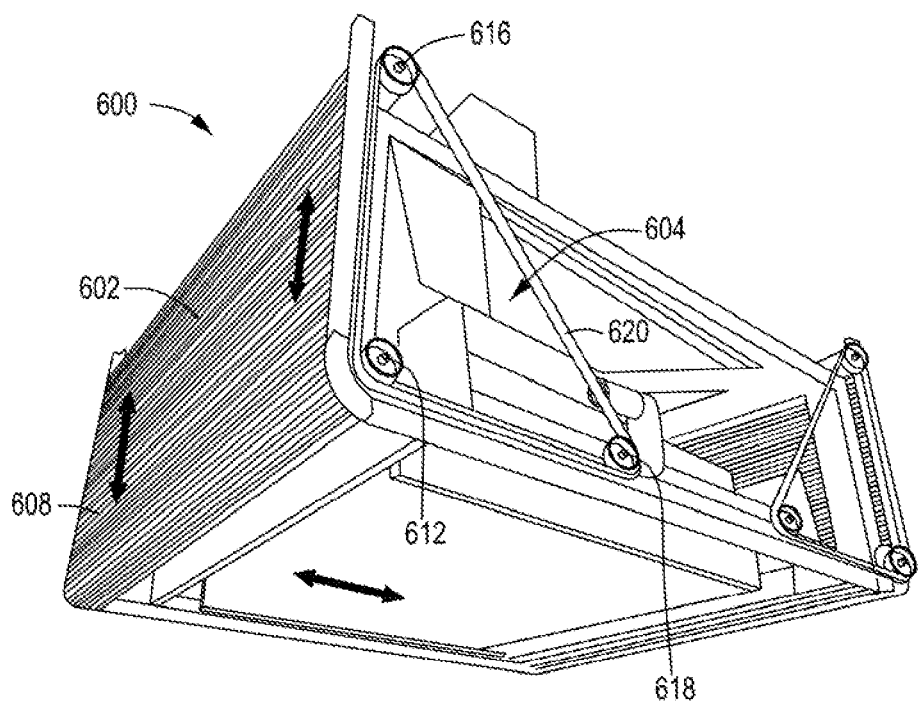
FIG. 8 is a perspective view of an embodiment of a multi-purpose end-of-arm tool looking up.

FIG. 1 shows an embodiment of a multi-purpose end-of-arm tool (EOAT) 100, with a mast system 200, a frame 300, a clamp system 400 (shown in FIG. 3), a vacuum system 500 (shown in FIG. 7), and an undercarriage system 600 (shown in FIG. 8). In embodiments, EOAT 100 may be controlled by wireless communication. In embodiments, mast system 200 may be a multi-attachable system. Further, in embodiments, mast system 200 may comprise a mast 202, one or more mast gussets 204, and a mast plate 206.

In the embodiment shown in FIG. 1, mast 202 is shown as a square column. Mast 202 is also shown to have a vertical orientation. In other embodiments, mast 202 may comprise a rectangular or circular column, as well as other shapes. Further, in embodiments, mast 202 may comprise steel 1018, aluminum, or other lightweight composites. In embodiments, mast 202 may comprise dimensions of about 6 inches by about 8 inches by about 12 feet tall. In other embodiments, mast 202 may comprise dimensions of about 12 inches by about 12 inches by about 10 feet tall. Other embodiments may comprise other dimensions. In embodiments, mast 202 may be connected to a robot or other device such as, but not limited to, gantries, articulating robot arms, or conventional palletizing machines, which may transport EOAT 100 and its payload. In embodiments, the top of mast 202 may be open. In embodiments, mast 202 may be bolted to a z-beam on a gantry. In those embodiments, the z-beam may have dimensions of about 0.5 inches by about 6 inches by about 8 inches with multiple lengths. In other embodiments, mast 202 may be bolted to a z-beam on an articulating robot or a high/low level conventional palletizing automation machine. In embodiments, EOAT 100 may receive power through the connection to the articulating robot, conventional palletizing automation machine, or similar devices. In embodiments, mast 202 may allow for electrically connections to a power source by use of cables—flexible power tracks with junction boxes may be employed.

Also shown in the embodiment in FIG. 1 are the one or more mast gussets 204. FIG. 1 shows three mast gussets 204 with a fourth mast gusset 204 not illustrated. In embodiments, mast system 200 may comprise four mast gussets 204, eight mast gussets 204, or any other number of gussets 204 needed for the particular circumstances encountered. In embodiments, mast gussets 204 may have a round, square, or rectangular shape. In certain embodiments, mast gussets 204 may be square-shaped with dimensions of about 1.25 inches by about 1.25 inches and a thickness of about 0.25 inches. In embodiments, mast gussets 204 may vary in dimensions and thickness depending on the payload. In embodiments, mast gussets 204 may comprise aluminum or steel. Additionally, mast gussets 204 may be hollow. In embodiments, the length of the mast gussets 204 may be from about 20 inches to about 30 inches. As shown in the embodiment in FIG. 1, one end of each mast gussets 204 may be attached to one corner of mast 202. FIG. 1 also shows that in certain embodiments the other end of each mast gusset 204 may be attached to a frame gusset 302. In embodiments, the point of attachment of each mast gusset 204 to mast 202 may be anywhere on mast 202, but in embodiments the triangle created by mast 202, one mast gusset 204, and one frame gusset 302 may be as large as possible in order to improve stability. In embodiments, each mast gusset 204 may be attached to mast 202 by bolts or by welding. In embodiments, each mast gusset 204 may be attached to each frame gusset 302 by bolts or by welding.

FIG. 1 also shows an embodiment with mast plate 206. In this embodiment, mast plate 206 may be attached to the bottom of mast 202. In the embodiment of FIG. 1, mast plate 206 has a square shape, but in other embodiments mast plate 206 may comprise a rectangular shape. In certain embodiments wherein the mast plate 206 has a rectangular shape, mast plate 206 may comprise dimensions of about 15 inches by about 20 inches, and a thickness of about ¾ in. In embodiments, mast plate 206 may comprise 1018 steel. Further, in embodiments, mast plate 206 may be welded to mast 202. As further discussed below, in embodiments mast plate 206 may fit within a mast plate frame 304. In embodiments, mast plate 206 may be welded to mast plate frame 304. In embodiments, mast plate 206 may be constructed to allow for a quick change of EOAT 100. For example, mast plate 206 may be constructed to allow for a change to a smaller or different EOAT 100, if the need arises.

Figure 2:
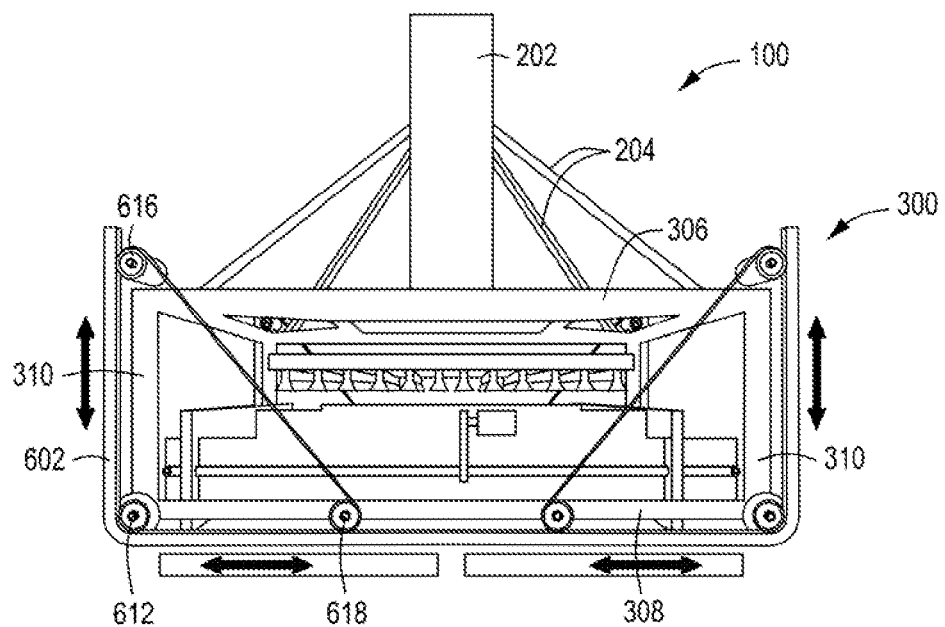
FIG. 2 is a side view of an embodiment of a multi-purpose end-of-arm tool.

FIG. 2 shows an embodiment of EOAT 100 and frame 300. In embodiments, frame 300 may be generally in the shape of a square or rectangular box. In embodiments, frame 300 may comprise a top frame 306, a bottom frame 308, and vertical slats 310. In embodiments, the components of frame 300 may be aluminum square tubing, round chromoly with an about 1-inch diameter, or square steel tubing with dimensions of about 0.125 inch by about 1 inch by about 1 inch. Additionally, components of frame 300 may comprise lightweight composites, such as carbon fiber. In embodiments, EOAT 100 may be capable of carrying payloads about 30 inches tall. Thus, in embodiments, frame 300 may comprise a height greater than 30 inches. For example, in certain embodiments, frame 300 may comprise a height of about 36 inches. In embodiments, the maximum horizontal size of a payload may be about 44 inches by about 52 inches. In embodiments, frame 300 and its associated components may be about 12 inches to about 16 inches bigger than the payload. For example, a typical industrial pallet load of products may comprise a maximum size of about 60 inches by about 68 inches. Thus, in embodiments, frame 300 and its associated components may comprise dimensions about 12 inches to about 16 inches bigger than these typical industrial pallet loads of products. In embodiments, the overall frame 300 may comprise a smaller or larger size depending on the application requirements. There are no limits on the dimensions of frame 300. In embodiments, the different parts of frame 300 may be welded or bolted to each other. In embodiments, the different parts of frame 300 may be hollow.

As shown in the embodiment of FIGS. 1 and 2, top frame 306 may be in the shape of a square. Further, in embodiments, top frame 306 may comprise frame gussets 302 and mast plate frame 304. In embodiments, top frame 306 may be attached to frame gussets 302 and mast plate frame 304. In embodiments, one end of each frame gusset 302 may be attached to the mast plate frame 304. In embodiments, each frame gusset 302 may be attached to the mast frame plate frame 304 at an exterior corner of the mast plate frame 304. In embodiments the other end of each frame gusset 302 may be attached to an interior corner of the top frame 306. In embodiments, there may be four frame gussets 302. Other embodiments may comprise eight frame gussets 302. Further, as shown in the embodiment of FIG. 1, mast plate frame 304 may comprise a square shape, but other shapes such as a rectangular shape may also be employed. In embodiments, mast plate frame 304 may comprise dimensions of about 15 inches by about 20 inches. Further, mast plate frame 304 may be 1-inch square tubing.

FIG. 2 also shows an embodiment of frame 300, wherein the bottom frame 308 comprises the same dimensions as top frame 306, except that bottom frame 308 does not comprise frame gussets 302 or mast plate frame 304. Further, FIG. 2 shows an embodiment of frame 300 comprising four vertical slats 310. In embodiments, frame 300 may comprise eight vertical slates 310 or any other appropriate number.

Figure 3:
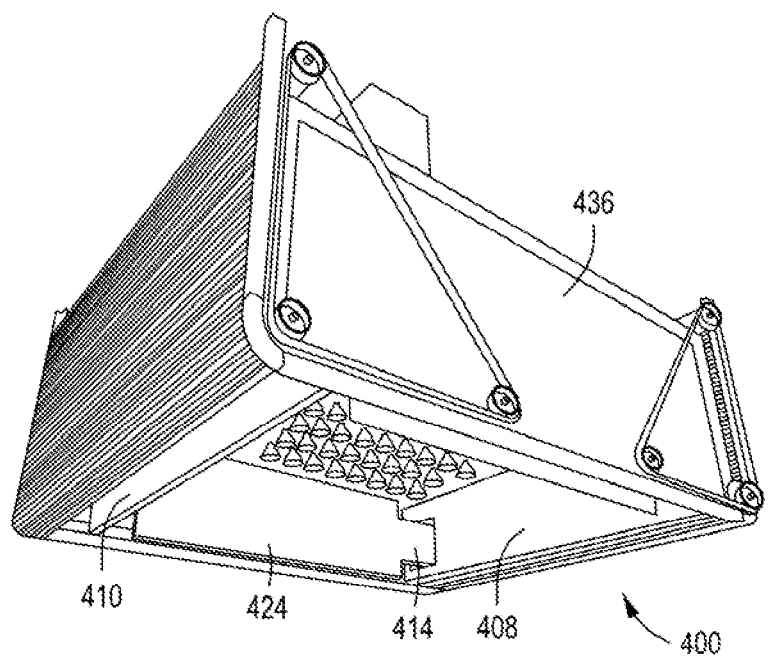
FIG. 3 is a perspective view of an embodiment of a multi-purpose end-of-arm tool looking up.
Figure 4:
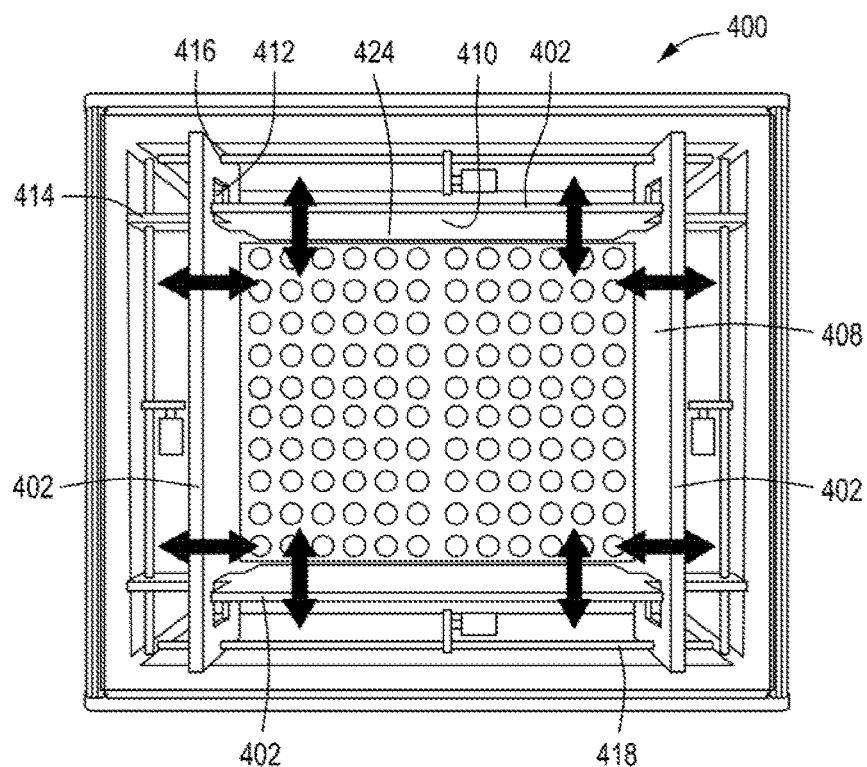
FIG. 4 is a bottom view of an embodiment of a multi-purpose end-of-arm tool.

FIGS. 3-6 show an embodiment of clamp system 400 from different positions. In embodiments, clamp system 400 may comprise clamp plates 402, ball-screw drives 418, and an actuator 406. In embodiments, clamp plates 402 may comprise first side-clamp plates 408 and second side-clamp plates 410. In embodiments, clamp system 400 may comprise two first side-clamp plates 408. In embodiments, the two first side-clamp plates 408 may be positioned parallel to one another and may have a vertical orientation. Further, as seen in the embodiment of FIG. 4, the first side-clamp plates 408 may be arranged perpendicularly to second side-clamp plates 410. In embodiments, each of the first side-clamp plates 408 may have a rectangular shape. In embodiments, first side-clamp plates 408 may comprise ⅜-inch aluminum 6061 plate or aluminum, or light-weight composites such as carbon fiber. In embodiments, the first side-clamp plates 408 may be sized depending on the application. The clamping of the payload is critical. In embodiments, "soft clamping" versus "hard clamping" may be employed depending on the products making up the payload and the layer configuration. In embodiments, the force of the clamping may be controlled ultimately with an algorithm.

As shown in the embodiment in FIG. 4, each first side-clamp plate 408 may comprise a major aperture 412 on each end. In embodiments, the major aperture 412 may square or rectangular. In embodiments, the dimensions of the major aperture 412 may depend upon what the product is being clamped. For example, it may depend on whether the product requires soft clamping or hard clamping. In embodiments, the major aperture 412 may accept the corresponding minor sections 414 of the second side-clamp plates 410. In embodiments, the size and range of the major aperture 412 may be determined by the range of products being picked up by EOAT 100, and therefore, the range of motion needed for each set of clamp plates 402. For example, in embodiments, an implementation would allow for the clamp plates 402 to open sufficiently to accept an about 44-inch by about 52-inch layer of payload, and to close sufficiently to secure an about 32-inch by about 40-inch layer of payload. In embodiments, these ranges could be extended to be larger or smaller.

In embodiments, the first side-clamp plates 408 may move in a horizontal plane, and this movement may be controlled through pre-written computer programs or by on-the-spot utilization of the algorithm. In embodiments, the two first side-claim plates 408 may move away from each other to a point of full extension, as discussed in the previous paragraph. Further, in embodiments, the two first side-clamp plates 408 may move towards each other to a point of full compression, as discussed in the previous paragraph.

Figure 6:
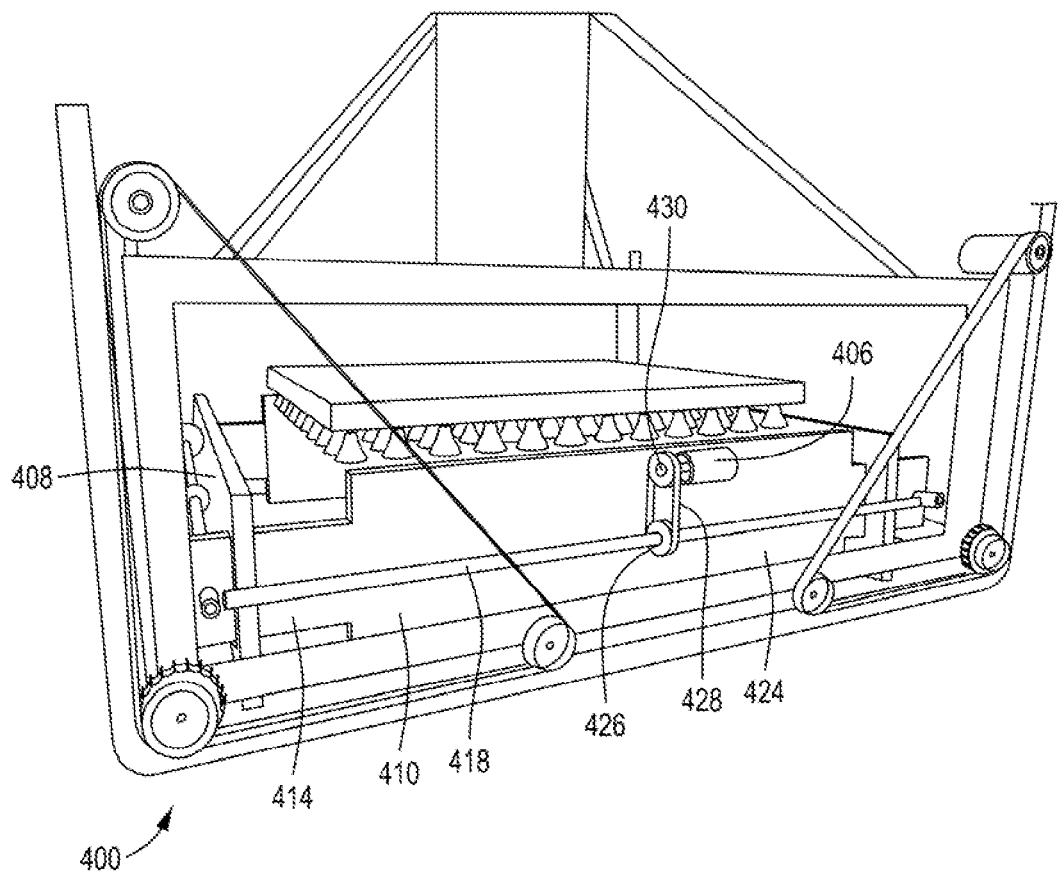
FIG. 6 is a perspective view of an embodiment of a multi-purpose end-of-arm tool without side-plates.

In embodiments, each first side-clamp plate 408 may comprise a minor aperture 416. In shown in the embodiment of FIG. 4, the minor aperture 416 may comprise a round shape. In embodiments, the minor apertures 416 may be designed to accept the ball-screw drive 418. In embodiments, actuator 406 (as shown in FIG. 6) may be employed to rotate the ball-screw drive 418. In embodiments, the ends of the ball-screw drive 418 may have opposing threads such that, when the ball-screw drive 418 is rotated in one direction (perhaps clockwise for example), the two first side-clamp plates 408 move towards each other. Likewise, when the ball-screw drive 418 is rotated in the opposite direction in embodiments (perhaps counter-clockwise), the two first side-clamp plates 408 move away from each other. In embodiments, an actuator 406 may be employed for each end of the two first-side clamp plates 408. Further, in embodiments, each end of each first-side clamp plate 408 may comprise a bearing 420 (not illustrated) and an alignment-compliant bearing mount 422 (not illustrated), through which the ball-screw drive 418 passes. It is this mechanism of "grabbing" the ball-screw drive 418 that allows for clockwise and counter-clockwise movement of the ball-screw drive 418 in embodiments.

In embodiments, clamp system 400 may comprise two second side-clamp plates 410. In embodiments, the two second side-clamp plates 410 may be positioned parallel to one another and may have a vertical orientation. In embodiments, second side-clamp plates 410 may comprise ⅜-inch aluminum 6061 plate or aluminum, or light-weight composites such as carbon fiber. In embodiments, the second side-clamp plates 410 may be sized depending on the application. Further, in embodiments, second side-clamp plates 410 may comprise a main section 424 and two minor sections 414. In embodiments, the main section 424 may have a rectangular shape. In embodiments, the minor sections 414 may each be located on opposite ends of main section 424. Each minor section 414 may have a rectangular shape in embodiments. In embodiments, each minor section 414 may fit within the corresponding major apertures 412 of the first side-clamp plates 408.

In embodiments, the second side-clamp plates 410 may move in a horizontal plane, and this movement may be controlled through pre-written computer programs or by on-the-spot utilization of the algorithm. In embodiments, the two second side-claim plates 410 may move away from each other to a point of full extension, as discussed in the previous paragraph. Further, in embodiments, the two second side-clamp plates 410 may move towards each other to a point of full compression.

In embodiments, each second side-clamp plate 410 may comprise a minor aperture 416. In shown in the embodiment of FIG. 4, the minor aperture 416 may comprise a round shape. In embodiments, the minor apertures 416 may be designed to accept ball-screw drive 418. In embodiments, actuator 406 (as shown in FIG. 6) may be employed to rotate the ball-screw drive 418. In embodiments, the ends of the ball-screw drive 418 may have opposing threads such that, when the ball-screw drive 418 is rotated in one direction (perhaps clockwise for example), the two second side-clamp plates 410 move towards each other. Likewise, when the ball-screw drive 418 is rotated in the opposite direction in embodiments (perhaps counter-clockwise), the two second side-clamp plates 410 move away from each other. In embodiments, an actuator 406 may be employed for each end of the two second side-clamp plates 410. Further, in embodiments, each end of each second side-clamp plate 410 may comprise a bearing 420 (not illustrated) and an alignment-compliant bearing mount 422 (not illustrated), through which the ball-screw drive 418 passes. It is this mechanism of "grabbing" the ball-screw drive 418 that allows for clockwise and counter-clockwise movement of the ball-screw drive 418 in embodiments.

Figure 5:
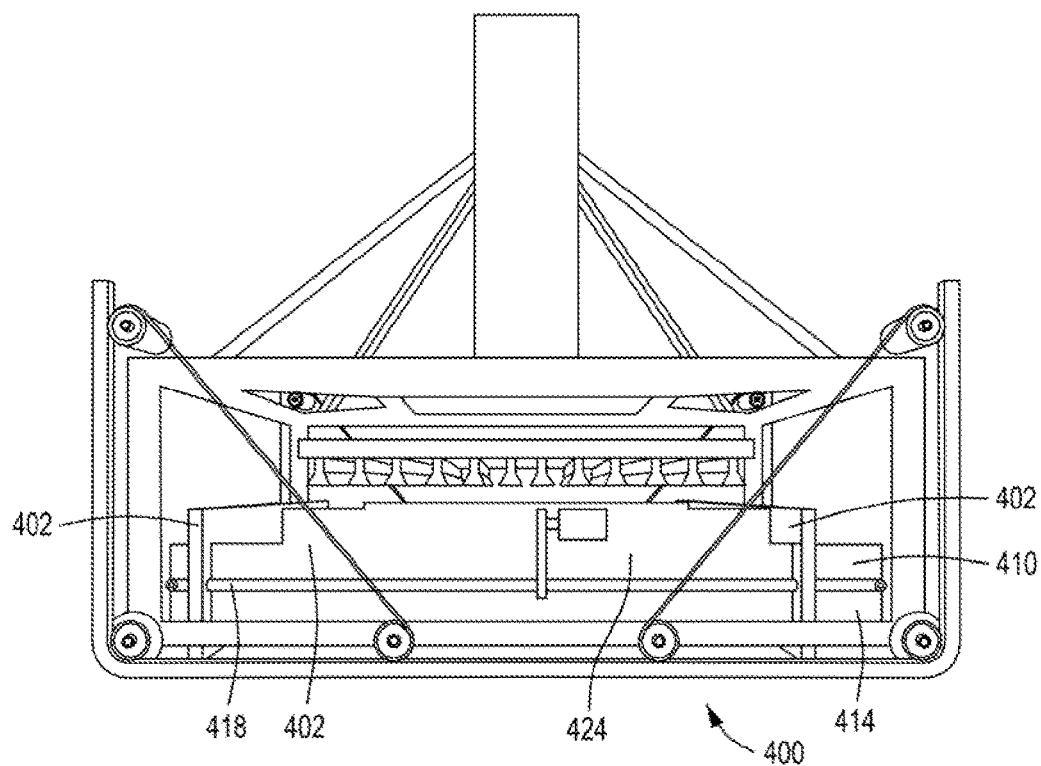
FIG. 5 is another side view of an embodiment of a multi-purpose end-of-arm tool.

In the embodiment shown in FIGS. 4-6, the clamp system 400 may comprise ball-screw drives 418. In embodiments, the clamp system 400 may comprise four ball-screw drives 418. In embodiments, the ball-screw drives 418 may have a round shape. In certain embodiments, the ball-screw drives 418 may have a diameter of about 1 inch to about 1.5 inches. In embodiments, the length of the ball-screw drives 418 may be about 46 inches to about 54 inches. In embodiments, the ball-screw drives 418 may be made of steel, and the ball-screw drives 418 may have threads machined onto them. Another name for ball-screw drives 418 may be lead screws. In embodiments, the ball-screw drives 418 are solid. In embodiments, the ball-screw drives 418 may also comprise a pulley 426, which may be located at roughly the mid-point of the ball-screw drive 418. In embodiments, pulley 426 may be rotated by a belt 428, wherein belt 428 may also be connected to an actuator pulley 430. In embodiments, the actuator pulley 430 may be connected to an actuator shaft 432 (not illustrated), and the actuator shaft 432 may be connected to actuator 406. In embodiments, actuator 406 may rotate the actuator shaft 432, which in turn may rotate pulley 430. In embodiments, the rotation of pulley 430 may cause the rotation of the ball-screw drive 418, which may lead to the rotation of either the first side-clamp plates 408 or the second side-clamp plates 410, depending on which set of clamp plates 402 the ball-screw drive 418 is connected to.

Further, in embodiments, actuator 406 and ball-screw drive 418 may be connected with brackets 434 (not illustrated) to a side-plate 436 (as shown in FIG. 1), which may cover an entire side of EOAT 100, as shown in FIG. 3. In embodiments, the ends of the first side-clamp plates 408 and the ends of the second side-clamp plates 410 may be supported by a slide-rail 438 (not illustrated), which may also be connected to, and supported by, the side-plate 436.

FIG. 6 shows an embodiment of actuator 406. In embodiments, actuator 406 may be a servo, electric motor, hydraulic motor, or pneumatic motor. In embodiments, each first side-clamp plate 408 and each second side-clamp plate 410 may have at least one actuator 406. In embodiments, each actuator 406 may be programmable. In embodiments, the power source for the actuators 406 is electrical cables (not illustrated), which pass through flexible tracks (not illustrated). In embodiments, the actuator 406 may drive the clamp plates 402 that the actuator 406 is attached to. In embodiments, actuator 406 may move its related clamp plate 402 to a specified position, and actuator 406 may be programmed to apply a set amount of force to the payload depending on the particular payload. In embodiments, the actuators 406 may coordinate with each other. In embodiments, the clamp plates 402 may be moved to various positions and instructed to apply varying amounts of pressure on a payload, depending on the structural integrity of the payload product encountered. In embodiments, the clamp system 400 may be programmed depending on the payload being handled, and the clamp system 400 may be software controlled, which allows for dynamically adjusting behavior.

FIG. 7 shows an embodiment of EOAT 100 comprising vacuum system 500. In embodiments, vacuum system 500 may comprise a plate 502 and one or more vacuum cups 504.

As shown in FIG. 7, in embodiments, a plate 502 may hang below mast plate 206. In embodiments, plate 502 may be square or rectangular in shape. In embodiments, plate 502 may comprise ½-inch aluminum 6061 plate or ⅜-inch aluminum 6061 plate. Further, in embodiments, the dimensions of plate 502 may vary with each implementation. Generally, in embodiments, the area of the vacuum system 500 may be smaller than the smallest payload layer to be picked. This may allow the clamp plates 402 to engage the payload at the smallest dimension of the clamp plates 402 while allowing the vacuum system 500 to move up and down inside the area of the clamp plates 402 in order to assist with picking and supporting the payload if needed. For example, in embodiments, if the clamp plates 402 engage and grip a minimum layer size of about 32 inches by about 40 inches, the plate 502 may be about 30 inches by about 38 inches. In embodiments, plate 502 may be controllable and zoned for certain pick up requirements. In embodiments, plate 502 may be capable of up and down movement by employing cables and idler pulleys attached to a drive pulley mounted on a servo. In embodiments, plate 502 may be bolted to a mechanism (not illustrated), which causes plate 502 to ascend and descend. In embodiments, the plate 502 may comprise a top plate 506 (not illustrated) and a bottom plate 508 (not illustrated). In embodiments, the bottom plate 508 may be machined by a CNC, which may drill and thread the bottom plate 508. In embodiments, the top plate 506 may be machined to provide pockets. In embodiments, the top plate 506 and the bottom plate 508 are bolted to each other to create a vacuum chamber 510 (not illustrated). In embodiments, the pick requirements may include a single-product case tray, a multiple-product case tray, a row pick, or a complete layer. Further, in embodiments, a vacuum may be applied to the plate 502 by employing pressurized air and vacuum generator, vacuum pumps, or a blower. In embodiments, these devices may be connected to plate 502 by employing a vacuum manifold and a round outlet and then connecting a hose from the blower vacuum manifold to the plate 502. In embodiments, the power source for a blower, for example, may be provided by electrical cables routed through the flexible cable tracks.

In embodiments, the one or more vacuum cups 504 may be arranged horizontally. In embodiments, the dimensions of the array of vacuum cups 504 may vary to fit as many vacuum cups 504 as possible on a given vacuum chamber 510. In embodiments, the dimensions of each individual vacuum cup 504 may be customized for each application depending on the payload to be picked. In embodiments, vacuum cups 504 may have a diameter of between about 2.5 inches and about 4 inches. In embodiments, vacuum cups 504 may comprise rubber, silicon, or foam edge, and the materials employed may be customized for each application. In embodiments, the number, size, placement, and construction of the vacuum cups 504 may vary according to the product pattern and payload at issue. Generally, one reason for employing the vacuum plate 502 for assisting with the picking up of a payload in combination with the clamp plates 402 is to allow for the following sequence in certain embodiments: lowering to product and engaging vacuum system 500, lifting the product and engaging clamp system 400; engaging the undercarriage system 600, and then releasing the vacuum created by the vacuum system 500.

FIG. 8 shows an embodiment of the undercarriage system 600. In embodiments, undercarriage system 600 may comprise an undercarriage 602, a pulley system 604, and a drive mechanism 606 (not illustrated).

Figure 9:
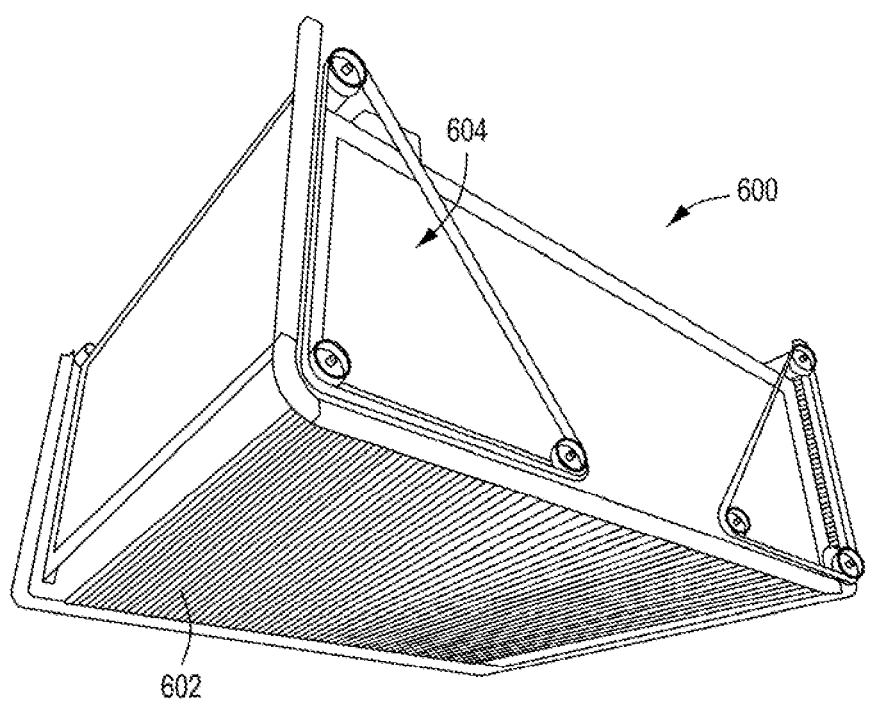
FIG. 9 is a perspective view of an embodiment of a multi-purpose end-of-arm tool looking up.

In embodiments, undercarriage 602 may comprise two pieces, and the two pieces of undercarriage 602 may be flexible. In embodiments, undercarriage 602 may comprise carbon fiber, certain fiber-cloth materials, or slats connected to each other. In embodiments, the two pieces of undercarriage 602 may move between a retracted and an extended position. FIG. 8 shows an embodiment of the undercarriage system 600 where the undercarriage 602 is in the retracted position, and FIG. 9 shows an embodiment of the undercarriage system 600 where the undercarriage 602 is in the extended position. In embodiments, undercarriage 602 may comprise slats 608 or bars. In embodiments, the number of slats 608 may vary depending on the size of frame 300. In embodiments, the slats 608 may be separated by roughly 2 inches to roughly 3 inches. In embodiments, the slats 608 may have a diameter of 1 inch. In embodiments, the slats 608 may be round or square, and the slats 608 may roll freely. In embodiments, the configuration of slats 608 may be a series of flat bars and round bars—or actual slats (fiber) connected with round tubes arranged to create a near solid surface. In embodiments, the slats 608 may be connected with round fiber tubes. Alternatively, in other embodiments, the slats 608 may have a large size and may be composed of steel or fiber material. There are many possible configurations and materials for slats 608. For example, in embodiments, steel rollers may be employed. Another possibility for slats 608 is to use the IGUS® cable track concept. Further, in embodiments, the surface of undercarriage 602 may be flat to improve depalletizing and palletizing the payload.

In embodiments, slats 608 may comprise steel, aluminum, carbon fiber, or similar stiff, durable materials. Alternatively, the undercarriage 602 may be comprised of a tightly stretched sheet, which may be comprised of load bearing material such as mylar, plastic, or nylon webbing. In embodiments, the undercarriage 602 may be controlled by a drive mechanism, which moves the undercarriage 602 along formed channels 610 (not illustrated). In embodiments, formed channels 610 may be u-shaped and may guide the rod-ends of the undercarriage 602 as it is moved from a retracted position to an extended position and back again. Further, in embodiments, a lower corner pulley 612 may comprise a sprocket 614 (not illustrated). In embodiments, sprocket 614 may be meshed into a chain to which the rod ends of the undercarriage 602 are attached. In embodiments, the rotating of the lower corner pulley 612 may cause sprocket 614 to rotate. In embodiments, sprocket 614 may push and/or pull the chain to which the rod ends of the undercarriage 602 are attached, back and forth along the formed channels 610.

In FIGS. 8 and 9, the embodiment of the undercarriage system 600 comprises a pulley system 604. In embodiments, there may be four groups of pulleys with each group comprising three pulleys. In embodiments, each side of frame 300 without the undercarriage 602 may have two groups of pulleys or six total pulleys per side. In embodiments, each group of pulleys may form a right triangle. In embodiments, there may be the lower corner pulley 612, which may have a diameter of about 4 to 5 inches; an upper corner pulley 616, which may have a diameter of about 4 to 5 inches; and a lower frame pulley 618, which may also have a diameter of about 4 to 5 inches. In embodiments, the lower corner pulley 612, the upper corner pulley 616, and the lower frame pulley 618 may each be attached to frame 300. Further, in embodiments, the lower corner pulley 612, the upper corner pulley 616, and the lower frame pulley 618 may be connected by a pulley belt 620. In embodiments, the lower corner pulley 612, the upper corner pulley 616, and the lower frame pulley 618 may be controlled by the pulley belt 620, which is controlled by drive mechanism 606. Alternatively, in some embodiments, the undercarriage 602 may be controlled by a drive belt or chain. Additionally, in embodiments, the undercarriage system 600 may also comprise cameras 624 (not illustrated). In embodiments, cameras 624 may be located on the upper, inside part of frame 300. In embodiments, cameras 624 may be located adjacent to or on vacuum plate 502.

Figure 10A:
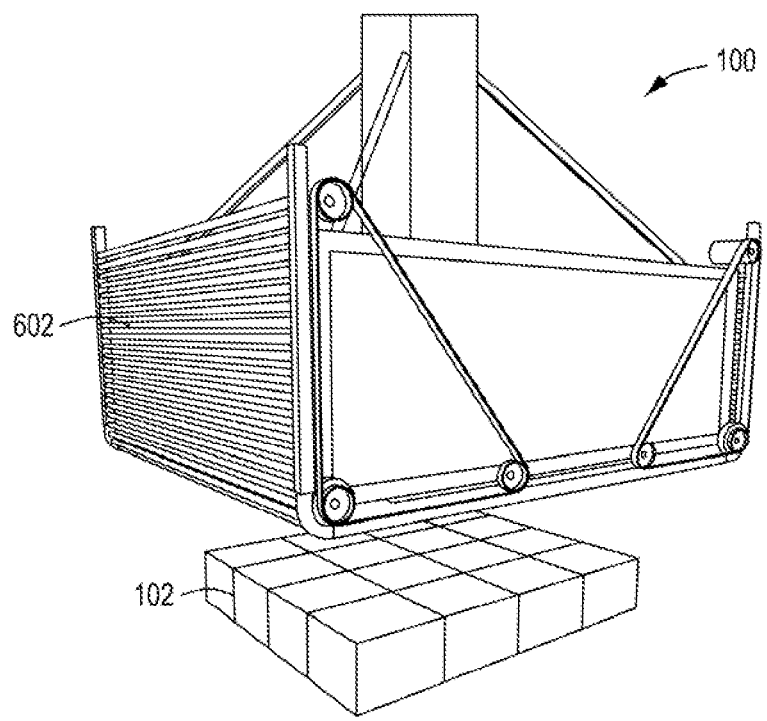
FIG. 10A is a perspective view of an embodiment of a multi-purpose end-of-arm tool as it approaches a payload.
Figure 10B:
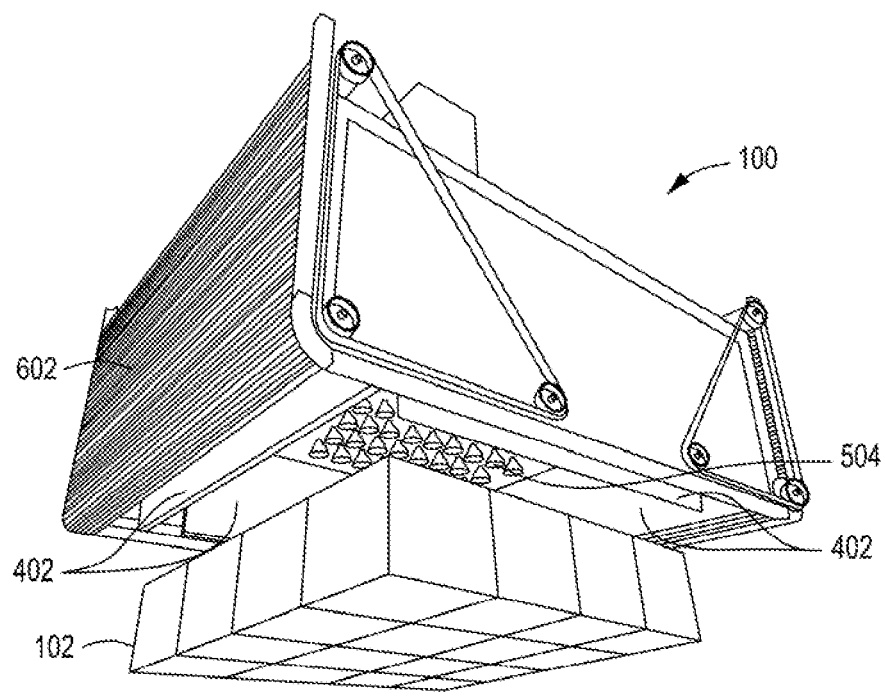
FIG. 10B is a perspective view of an embodiment of a multi-purpose end-of-arm tool as it descends over a payload.
Figure 10C:
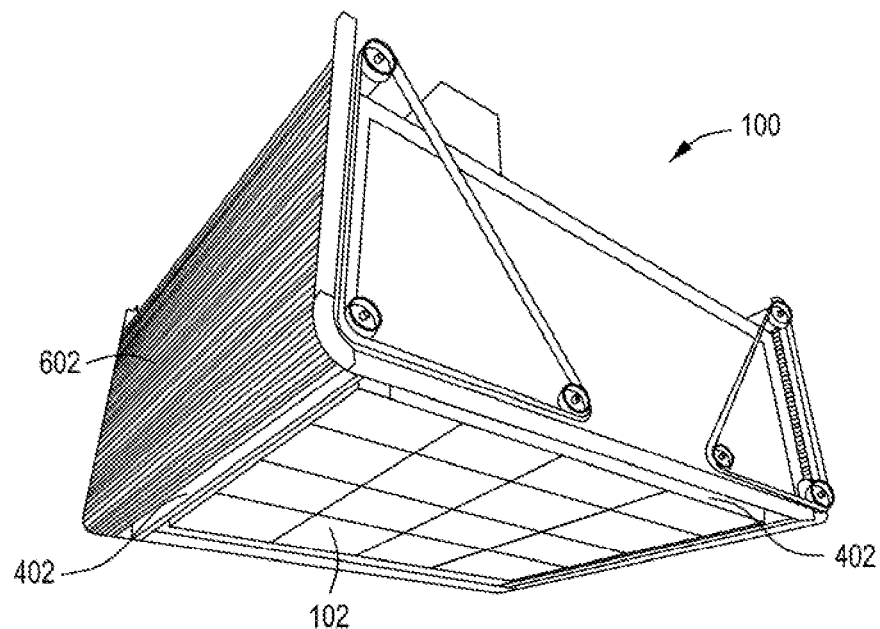
FIG. 10C is a perspective view of an embodiment of a multi-purpose end-of-arm tool as it descends over a payload.
Figure 10D:
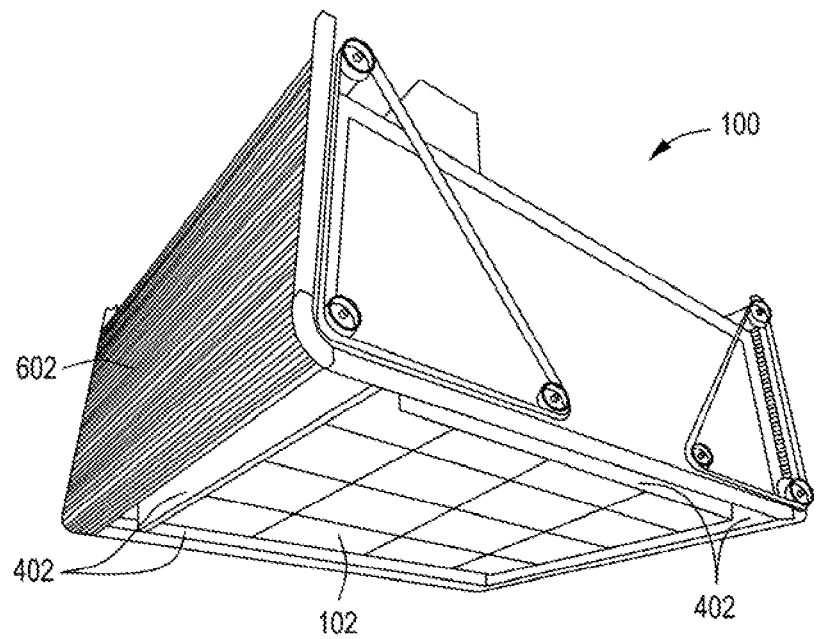
FIG. 10D is a perspective view of an embodiment of a multi-purpose end-of-arm tool as it engages a payload.

The following is an example of the operation of an embodiment of the EOAT 100, but this description is not intended to limit the method of operation. In embodiments, EOAT 100 may be programmed prior to operation by employing an algorithm platform. Initially, undercarriage 602 may be in the retracted position, and the clamp plates 402 may be in the extended position as shown in FIG. 3. In embodiments, the EOAT 100 may position and align itself over a payload 102 as shown in FIG. 10A. In embodiments, the EOAT 100 may then descend towards the payload 102, and the EOAT 100 may stop its descent at a predetermined height as shown in FIGS. 10B and 10C. Next, in embodiments the vacuum cups 504 may be engaged with the payload 102. In embodiments, the clamp plates 402 may then be engaged with the payload 102 once the payload 102 has already been picked by vacuum cups 504 as shown in FIG. 10D. In embodiments, EOAT 100 may ascend and raise the payload 102 into the interior of the EOAT 100 creating an air gap below the payload 102. In embodiments, this may be followed by deploying the undercarriage 602 underneath the payload 102 as shown in FIG. 9. In certain embodiments, the payload 102 may already have been picked up and the EOAT 100 moving while the undercarriage 602 is being deployed. In embodiments, the EOAT 100 may ascend and travel to its destination for the payload 102. Upon reaching its destination, the process may be reversed except that undercarriage 602 may not move to a retracted position until the destination coordinates are reached and the EOAT 100 has descended to an appropriate height. Thus, the EOAT 100 descends to the destination coordinates and height for the particular payload. The appropriate height may be a function of the dimensional distance between the target layer and undercarriage 602. Undercarriage 602 may then be retracted. The clamp plates 402 may be rescinded and reengaged to square the layer to achieve tied layer. The vacuum plate 502 may be lowered until the payload 102 touches the surface of the destination location, and the vacuum cups 504 may be disengaged. In some embodiments, the vacuum system 500 may not be engaged because it may not be required for a certain payload 102. In those instances, the EOAT 100 may rely on the clamp system 400 without the assistance of vacuum system 500. The EOAT 100 may then ascend leaving the payload 102 at its target destination. In some embodiments, the cameras 624 may photograph and store the location for locating the payload 102 at a later time in three-dimensional space. The edges of the layer may be located, and this allows EOAT 100 to be repositioned such that, if the layer is off position, the EOAT 100 may be repositioned before descending.

Figure 11:
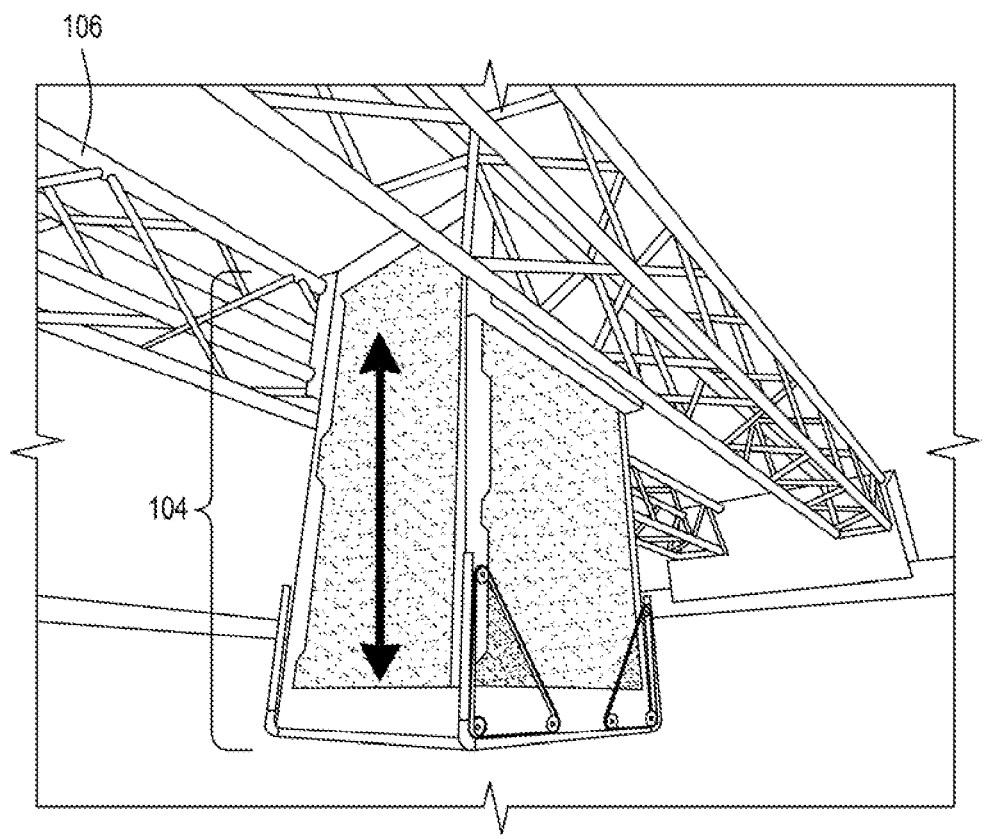
FIG. 11 is a perspective view of an embodiment of a pallet-carry end-of-arm tool and a gantry.

Another embodiment, referred to as a pallet-carry EOAT 104, is an extension of the EOAT 100. The pallet-carry EOAT 104 is a bigger version of the layer grip tool, EOAT 100. In most, if not all, respects, the pallet-carry EOAT 104 is a superset of EOAT 100. FIG. 11 shows an embodiment of the pallet-carry EOAT 104 on a dual Y-beam gantry robot 106.

The pallet-carry EOAT 104 may have all of the same functions, parts, and pieces as the EOAT 100. However, there may be some differences between the pallet-carry EOAT 104 and the EOAT 100. For example, the body of the pallet-carry EOAT 104 may be extended vertically compared to the EOAT 100, so that the pallet-carry EOAT 104 may hold an entire pallet stack of goods, including the pallet itself. Further, in the pallet-carry EOAT 104, the vertical travel of the vacuum plate 502 may have an extended range such that the vacuum plate 502 may raise up very high inside the tool when a full pallet is being carried. The total range of vertical motion of the vacuum plate 502 may be about 110 inches. Additionally, the internal clamps of the pallet-carry EOAT 104 may be reinforced such that the internal clamp plates 402 may be placed underneath a pallet and may be employed to lift an entire load of stacked product, including the pallet itself.

Figure 12A:
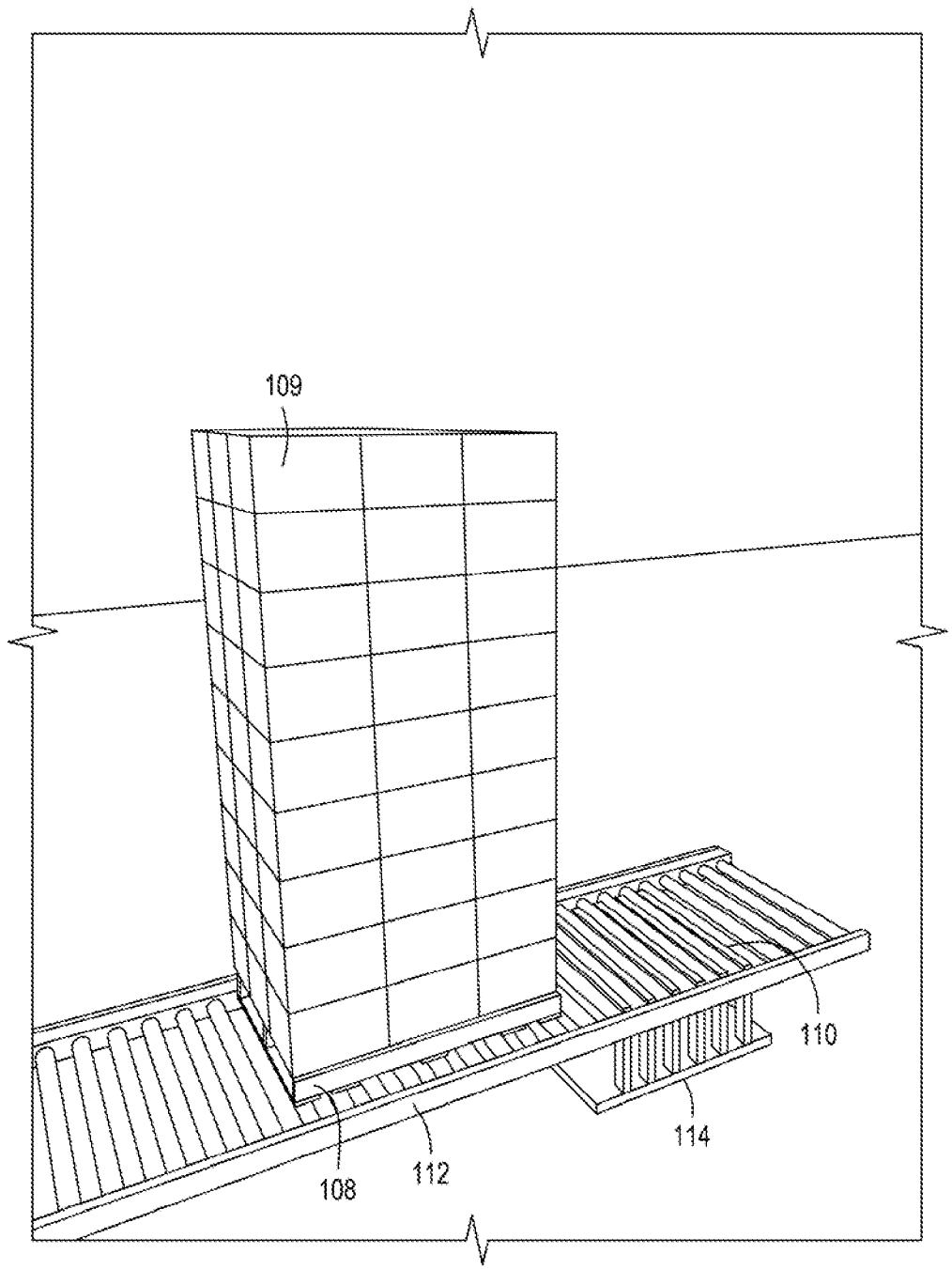
FIG. 12A is a perspective view of a pallet stack moving toward a pickup location on a conveyor.
Figure 12B:
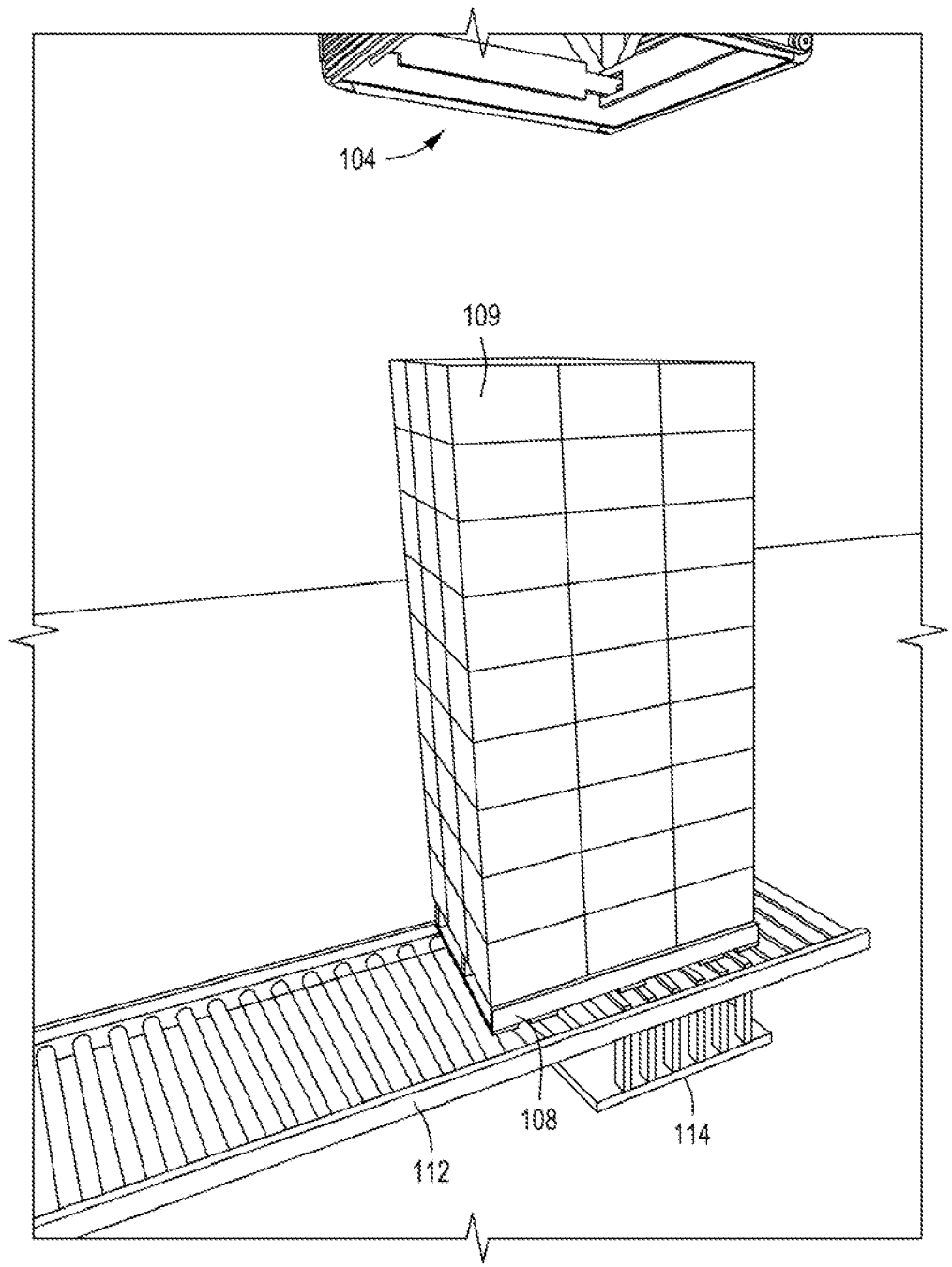
FIG. 12B is a perspective view of an embodiment of a pallet-carry end-of-arm tool positioned over a pallet stack.
Figure 12C:
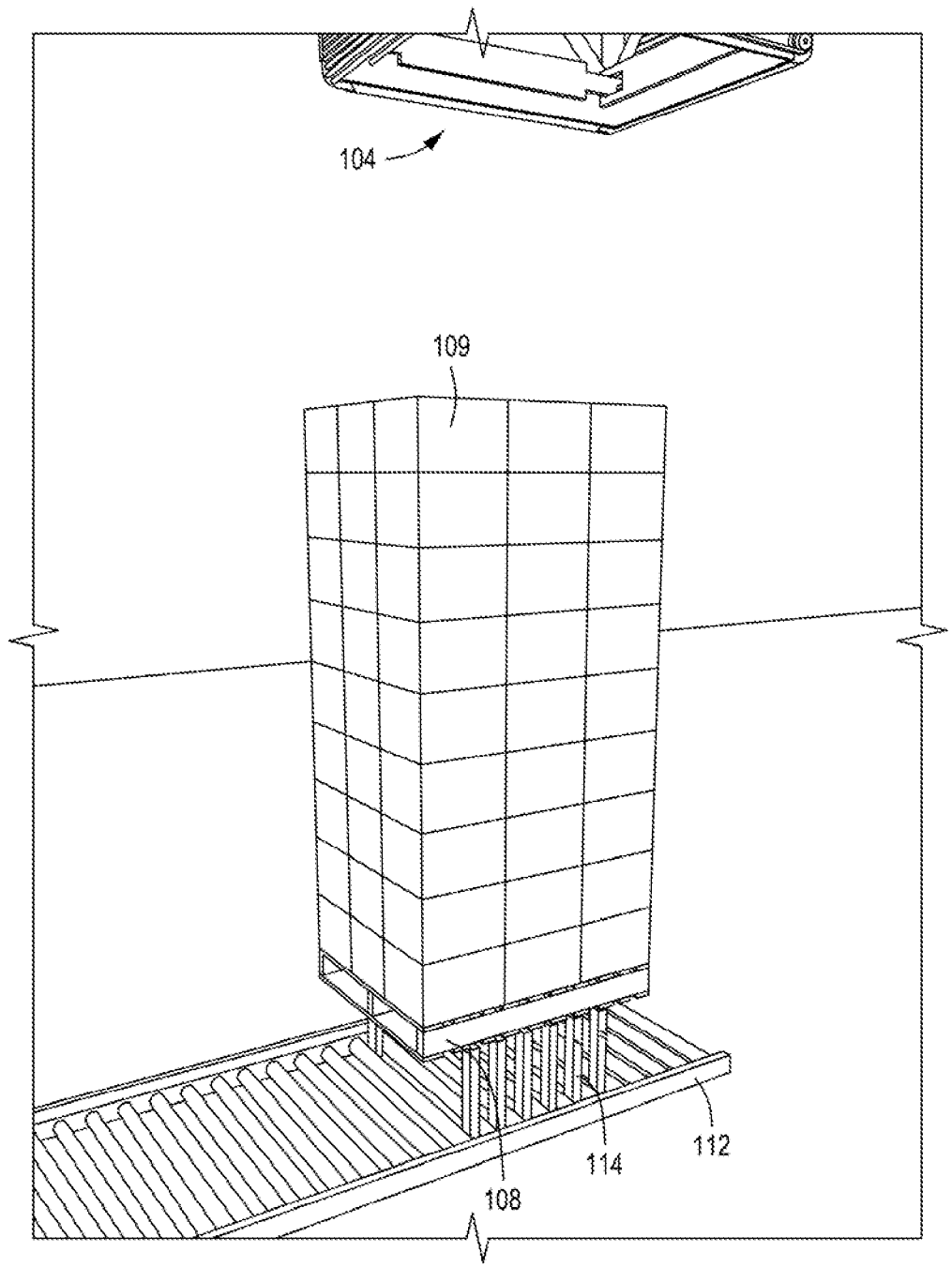
FIG. 12C is a perspective view of an embodiment of a pallet-carry end-of-arm tool positioned over a pallet stack, which has been raised on a lift table.
Figure 12D:
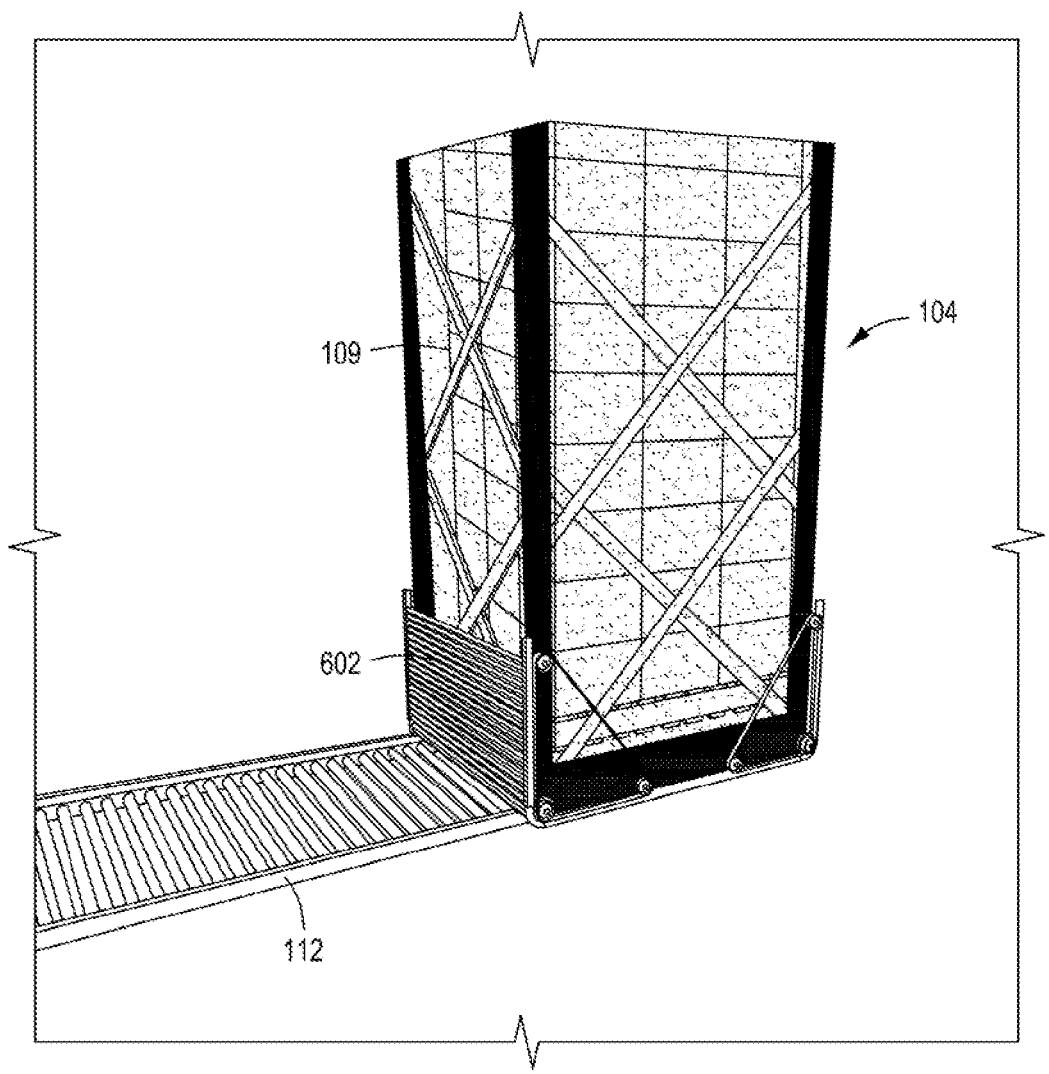
FIG. 12D is a perspective view of an embodiment of a pallet-carry end-of-arm tool encapsulating a pallet stack on a conveyor.
Figure 13:
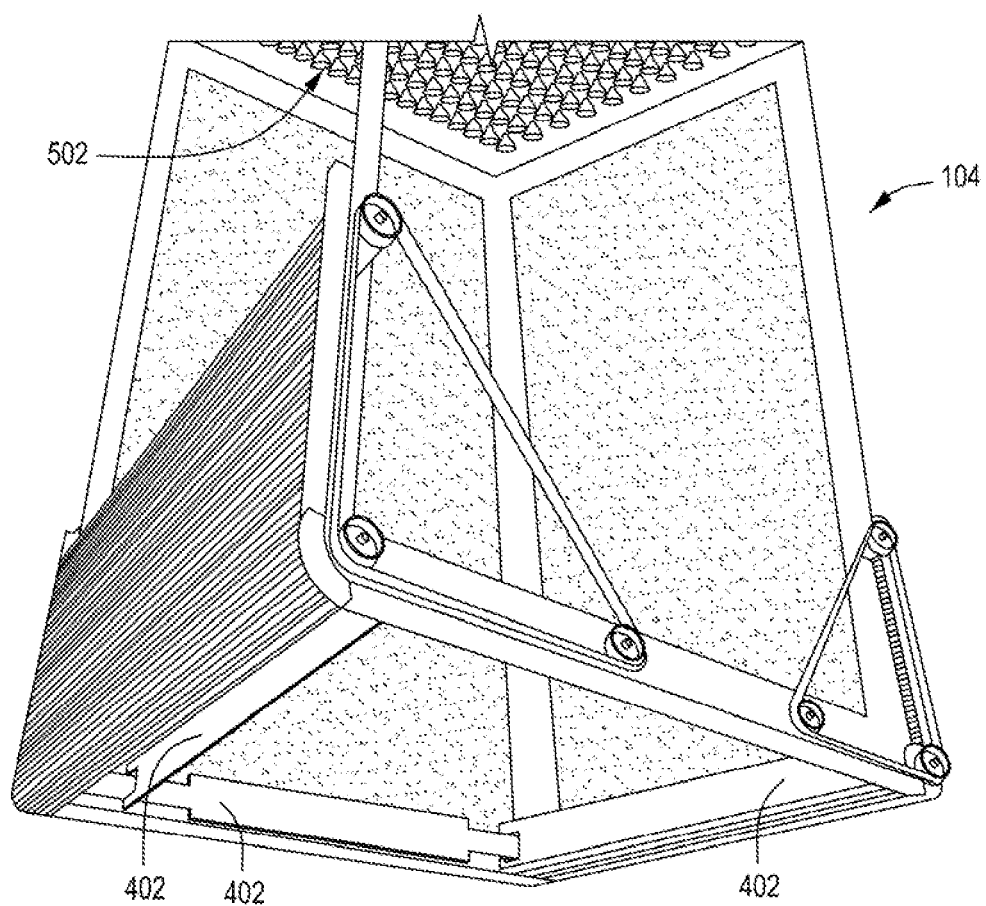
FIG. 13 is a bottom perspective view of an embodiment of a pallet-carry end-of-arm tool.
Figure 14:
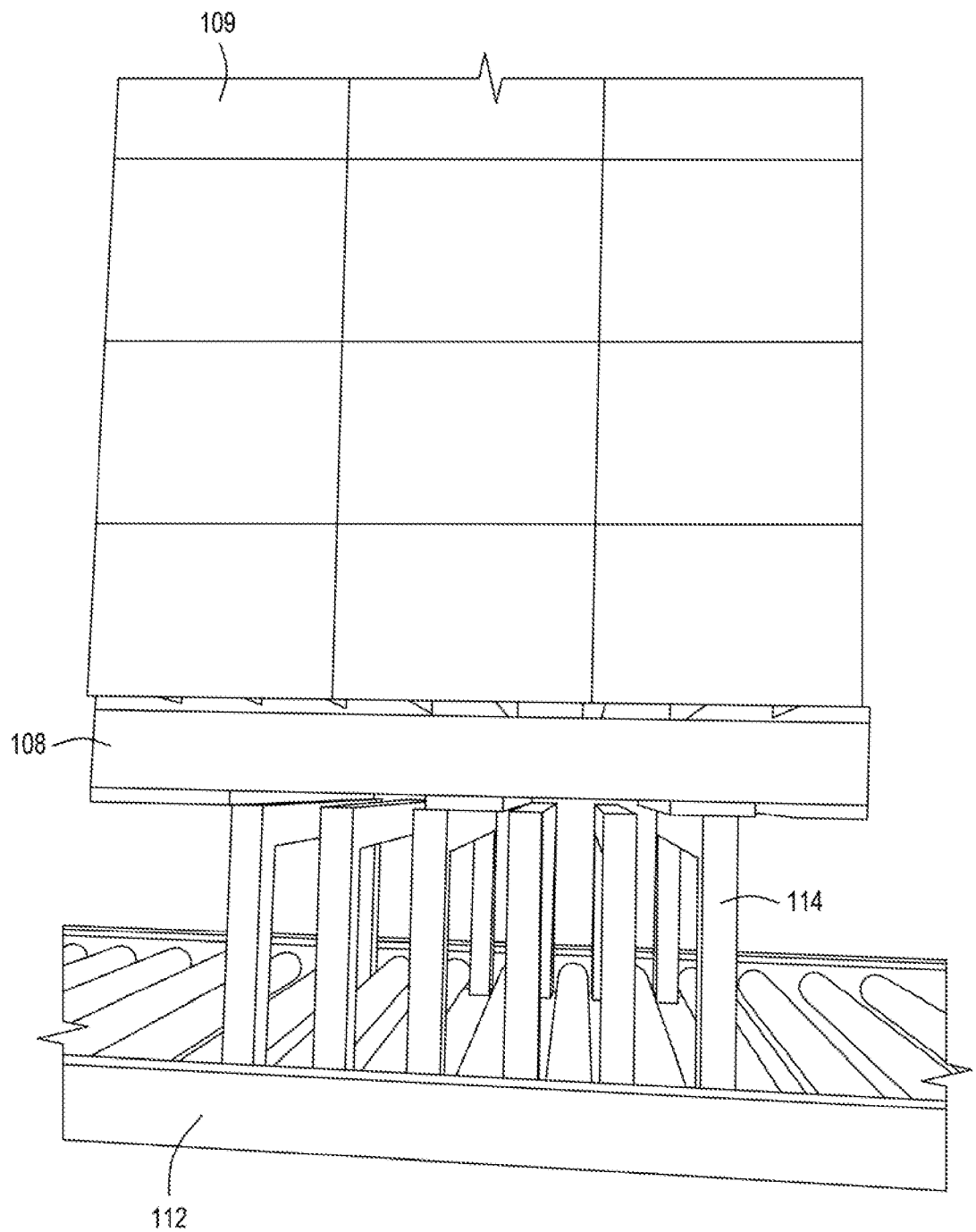
FIG. 14 is a side view of a pallet stack lifted by a lift table.

The following is a step-by-step process illustrating one method of employing the pallet-carry EOAT 104 to carry full pallet stacks. In FIG. 12A, a pallet 108 is shown approaching the pickup location 110 on a conveyor 112. The pallet 108 may be fully loaded or may have fewer than the full number of layers. In FIG. 12B, the pallet 108 is shown arriving at the pickup location 110 and is positioned/guided into a repeatable location by the conveyor 112. The pallet-carry EOAT 104 may position itself above the pallet 108. In FIG. 13, the clamp plates 402 of the pallet-carry EOAT 104 are completely open and the vacuum plate 502 is positioned high within the pallet-carry EOAT 104. This type of configuration provides space for the pallet-carry EOAT 104 to descend in such a way as to envelop the full pallet stack 109. In FIG. 12C, the pallet 108 is shown being lifted above the surface of the conveyor 112 by a custom lift table 114. FIG. 14 shows details of the pallet 108 that has been lifted off of the surface of the conveyor 112. FIG. 14 further shows the overhang space 116, which is the amount of area that the pallet 108 is overhanging lift table 114. This amount of overhang space 116 is the clearance that will be used to position the clamp plates 402 under the body of the pallet 108 and lift the pallet 108 from underneath. In FIG. 12D, the pallet-carry EOAT 104 is shown being lowered around the full pallet stack 109.

Figure 15:
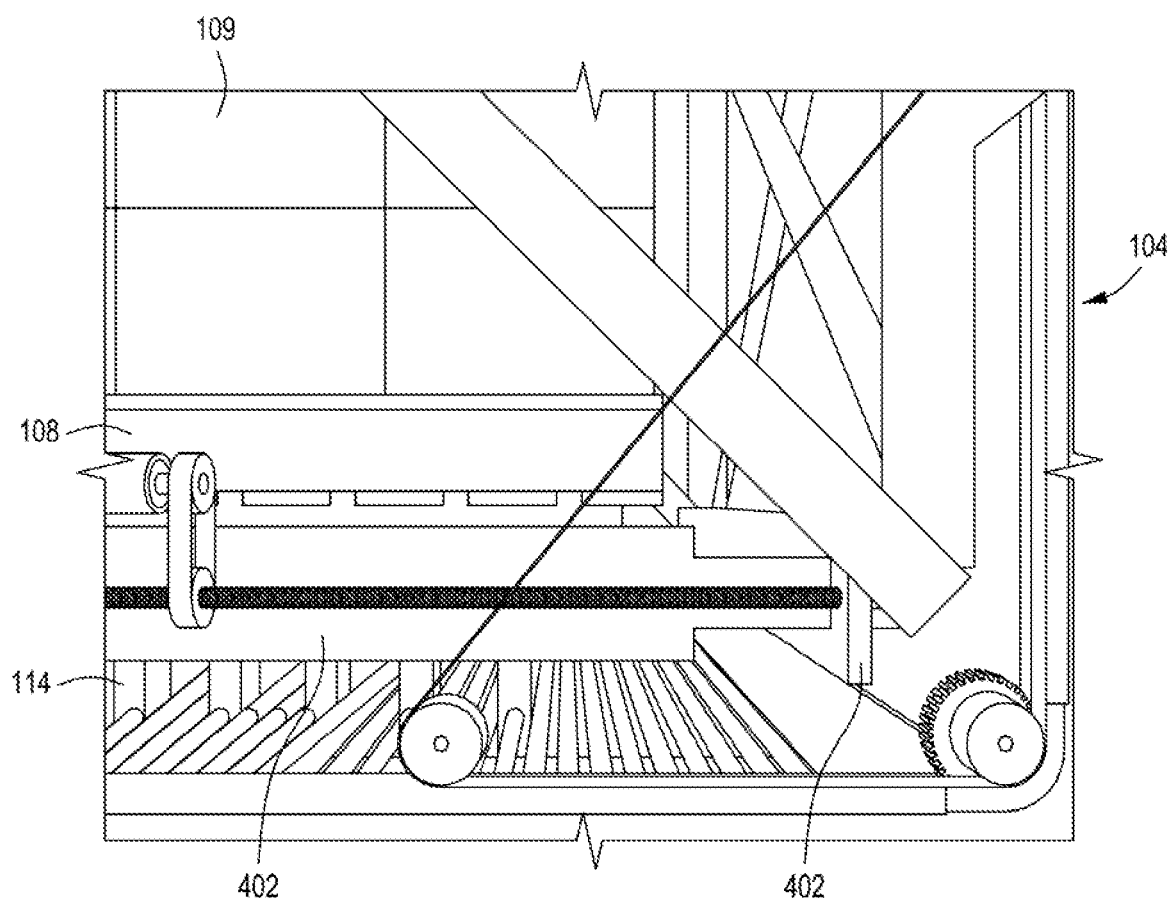
FIG. 15 is a side view of an embodiment of a pallet-carry end-of-arm tool engaging a pallet stack on a conveyor.

In the embodiment shown in FIG. 15, the pallet-carry EOAT 104 is shown to be positioned such that the entire width of the clamp plates 402 is lower than the pallet 108. This positioning, coupled with the overhang space 116 of the pallet 108 on all four sides, creates clearance such that the clamp plates 402 may be actuated inward and positioned under the pallet 108, which may create a lifting force around the entire perimeter of the pallet 108.

Figure 12E:
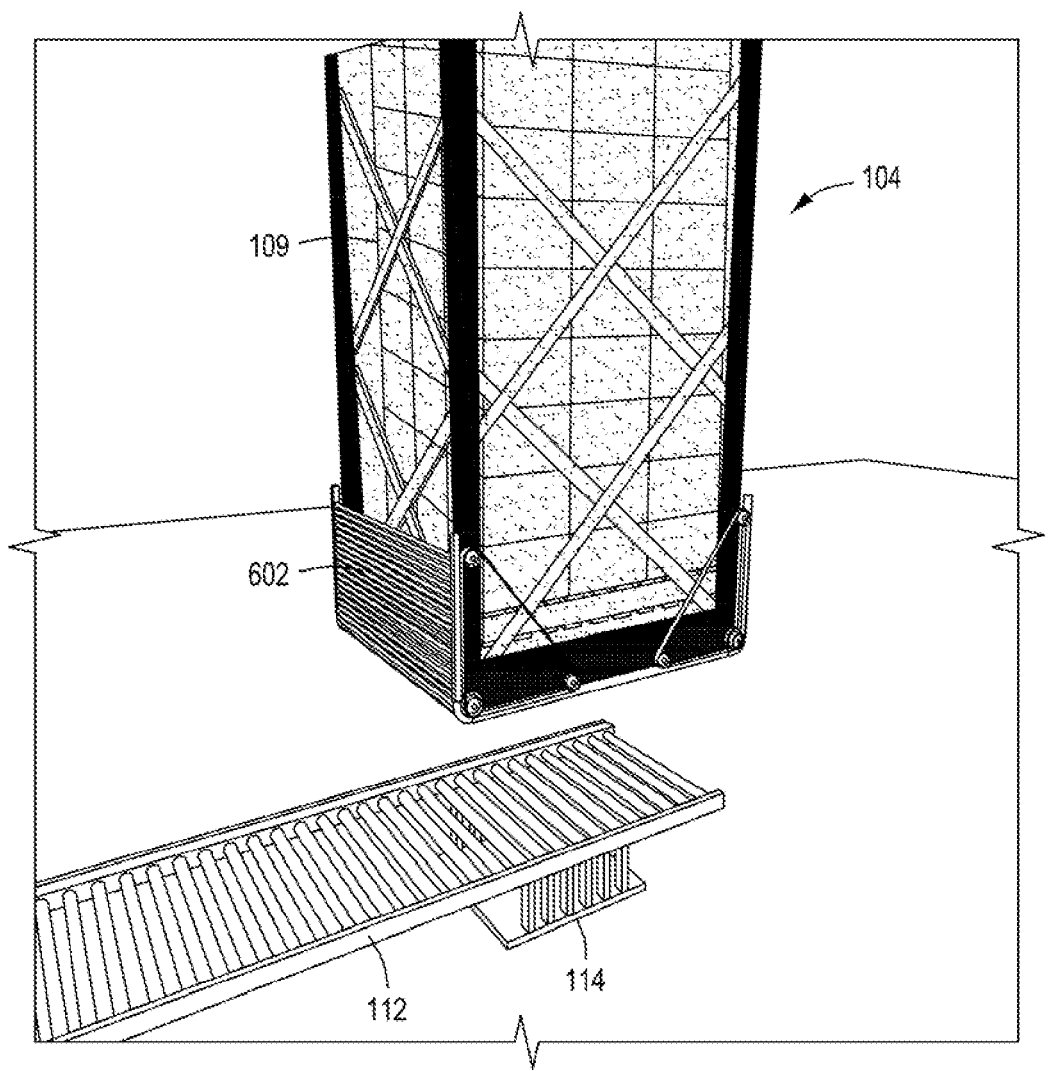
FIG. 12E is a perspective view of an embodiment of a pallet-carry end-of-arm tool lifting a pallet stack off of a conveyor.

In the embodiment shown in FIG. 12E, the clamp plates 402 are positioned underneath the pallet 108 and supporting the pallet 108 around the entire perimeter of pallet 108. The vacuum plate 502 may descend to a position where the vacuum plate 502 may rest on top of the layers of the product stack 109, lending additional stability to the load as it is carried. Further, the pallet-carry EOAT 104 may raise the pallet 108, including raising the pallet stack 109 from the conveyor 112. In embodiments, the lift table 114 may descend back to the original position of the lift table 114.

Figure 16:
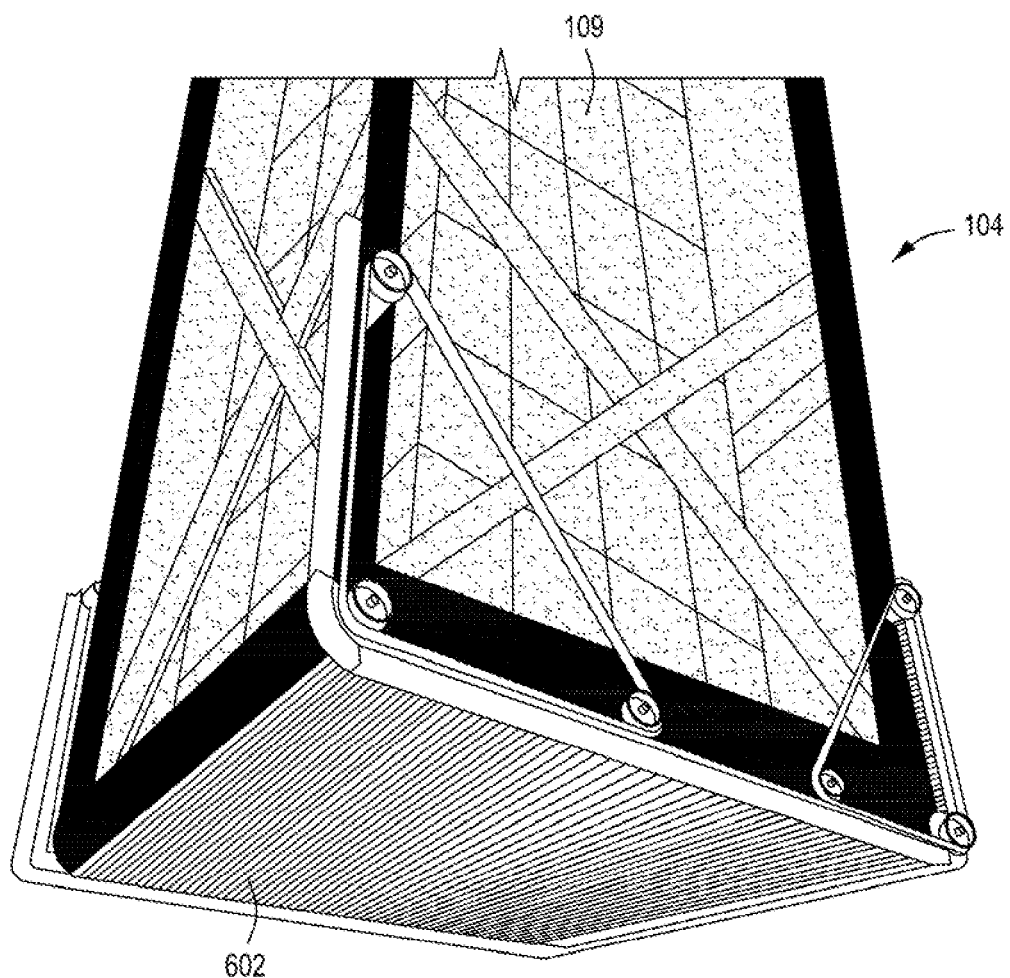
FIG. 16 is a bottom perspective view of an embodiment of a pallet-carry end-of-arm tool with the undercarriage deployed.

In FIG. 16, an alternative embodiment of deploying undercarriage 602 for additional security is illustrated. In embodiments, the pallet-carry EOAT 104 may carry the pallet stack 109 to a floor location. The floor location may be equipped with a stand 118 (not illustrated), which is similar in dimension and purpose to the lifter table 114 of the conveyor 112. In embodiments, the weight of the pallet 108 may rest on the floor stand 118. In embodiments, the clamp plates 402 may move to an open position and clear of the pallet 108, when the pallet 108 is resting on the floor stand 118. In embodiments, the pallet-carry EOAT 104 may be caused to ascend upwards and clear of the pallet 108 and stack 109, leaving the entire pallet stack 109 on the floor stand 118.

Figure 17:
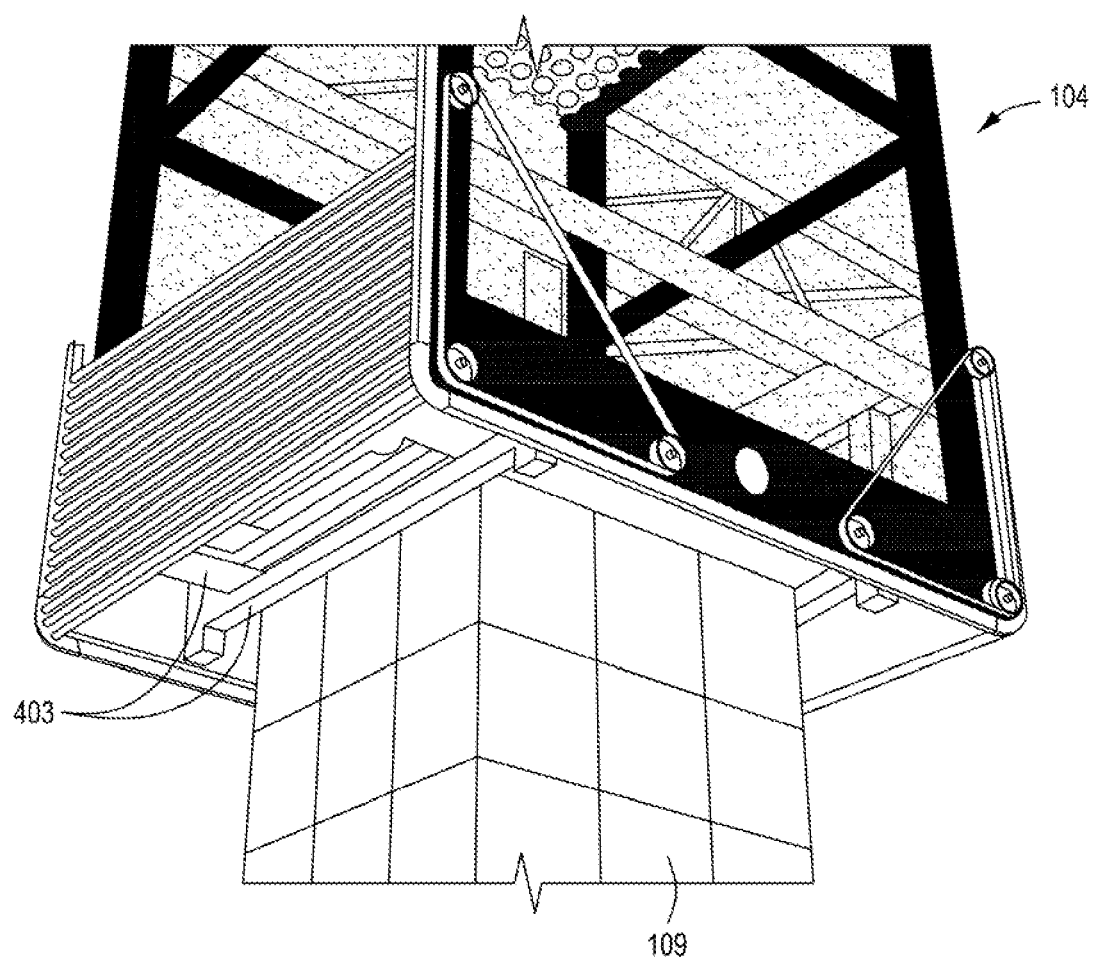
FIG. 17 is a perspective view of an alternative embodiment of a pallet-carry end-of-arm tool with clamp bars.

Further, in an alternative embodiment of the pallet-carry EOAT 104, as shown in FIG. 17, the clamp plates 402 are replaced with clamp bars 403, which may comprise interlacing bars as shown in FIG. 17. In embodiments, the clamp bars 403 may function similarly to the clamp plates 402, but the clamp bars 403 may have the benefit of requiring less material. As shown in FIG. 17, in embodiments a first set of opposing clamp bars 403 will replace the accepting plates 408, and a second set of opposing clamp bars 403, will replace the insertion plates 410. In embodiments, the first set of opposing clamp bars 403 may be perpendicular to the second set of opposing clamp bars 403 as illustrated in FIG. 17. Additionally, each of the clamp bars 403 may comprise 2 or more individual bars.

Generally, the above describes an improved multi-purpose end-of-arm tool for moving payloads from location to another, wherein the system may comprise a mast system, a frame, a clamp system, a vacuum system, and an undercarriage system.

What is claimed is:

1. A method of moving materials using an end-of-arm tool comprising:
    aligning the end-of-arm tool over a pallet stack, wherein the end-of-arm tool comprises an undercarriage in a retracted position, a plurality of clamp plates in an extended position, and one or more vacuum cups;
    lowering the end-of-arm tool towards the pallet stack;
    engaging the pallet stack with the one or more vacuum cups;
    positioning the plurality of clamp plates underneath the pallet stack; and
    raising the pallet stack into the interior of the end-of-arm tool.

2. The method of claim 1, wherein the method further comprises preprogramming the end-of-arm tool prior to the aligning step.

3. The method of claim 2, wherein the method further comprises lowering the end-of-arm tool to a preprogrammed, predetermined height over the pallet stack.

4. The method of claim 1, wherein the method further comprises deploying the undercarriage.

5. The method of claim 1, wherein the end-of-arm tool comprises a plurality of vacuum cups.

6. The method of claim 5, wherein the dimensions of each vacuum cup are customized for each application.

7. The method of claim 5, wherein the materials employed for each vacuum cup are customized for each application.

8. The method of claim 5, wherein the placement of each vacuum cup is customized for each application.

9. A method of moving materials using an end-of-arm tool comprising:
    aligning the end-of-arm tool over a pallet stack, wherein the end-of-arm tool comprises an undercarriage in a retracted position, a plurality of clamp bars in an extended position, and one or more vacuum cups;
    lowering the end-of-arm tool towards the pallet stack;
    engaging the pallet stack with the one or more vacuum cups;
    positioning the plurality of clamp bars underneath the pallet stack; and
    raising the pallet stack into the interior of the end-of-arm tool.

* * * * *